United States Patent
Ball et al.

(10) Patent No.: US 10,655,999 B2
(45) Date of Patent: May 19, 2020

(54) VALVE METER ASSEMBLY AND METHOD

(71) Applicant: Mueller International, LLC, Atlanta, GA (US)

(72) Inventors: Marty Scott Ball, Jonesville, NC (US); Scott Aron Linkel, Kannapolis, NC (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/584,169

(22) Filed: May 2, 2017

(65) Prior Publication Data
US 2017/0234712 A1 Aug. 17, 2017

Related U.S. Application Data

(63) Continuation of application No. 14/451,896, filed on Aug. 5, 2014, which is a continuation of application
(Continued)

(51) Int. Cl.
*G01F 15/14* (2006.01)
*E03B 7/07* (2006.01)
(Continued)

(52) U.S. Cl.
CPC .............. *G01F 15/14* (2013.01); *E03B 7/072* (2013.01); *G01F 3/12* (2013.01); *G01F 15/003* (2013.01);
(Continued)

(58) Field of Classification Search
CPC ........ G01F 15/066; G01F 3/12; G01F 15/063; G01F 1/6965; G01F 15/065;
(Continued)

(56) References Cited

U.S. PATENT DOCUMENTS

| 691,904 A | 1/1902 | Hallbergh |
| 1,165,429 A | 12/1915 | Mass |
(Continued)

FOREIGN PATENT DOCUMENTS

| CA | 2476119 | 2/2005 |
| WO | 9934140 | 7/1999 |

OTHER PUBLICATIONS

Ball, Marty Scott; Issue Notification for U.S. Appl. No. 13/149,720, filed May 31, 2011, dated Aug. 27, 2014, 1 pg.
(Continued)

*Primary Examiner* — Angelisa L. Hicks
(74) *Attorney, Agent, or Firm* — Taylor English Duma LLP

(57) ABSTRACT

An assembly for use with a water meter includes: a housing including a meter portion integrally formed with a valve portion; and a valve positioned in the valve portion and in sealable communication with an inner surface of the housing, the valve defining a valve inlet portion and a valve outlet portion, the valve inlet portion defining a vertical portion and separated from the valve outlet portion by a top edge portion defined in the vertical portion, the valve inlet portion sealable from the valve outlet portion by a diaphragm assembly of the valve, the diaphragm assembly defining a water leak passthrough configured to allow passage of water from a first side of the diaphragm assembly to a second side of the diaphragm assembly opposite from the first side.

28 Claims, 25 Drawing Sheets

Related U.S. Application Data

No. 13/149,720, filed on May 31, 2011, now Pat. No. 8,833,390.

(51) Int. Cl.

| | | |
|---|---|---|
| *G01F 3/12* | (2006.01) | |
| *G01F 15/00* | (2006.01) | |
| *G01F 15/06* | (2006.01) | |
| *G01M 13/00* | (2019.01) | |
| *G05D 7/06* | (2006.01) | |

(52) U.S. Cl.
CPC .......... *G01F 15/005* (2013.01); *G01F 15/061* (2013.01); *G01F 15/065* (2013.01); *G01F 15/066* (2013.01); *G01M 13/00* (2013.01); *G05D 7/0629* (2013.01); *Y10T 137/0318* (2015.04); *Y10T 137/7759* (2015.04); *Y10T 137/8158* (2015.04); *Y10T 137/8175* (2015.04); *Y10T 137/8593* (2015.04)

(58) Field of Classification Search
CPC ...... G01F 15/061; G01F 15/003; E03B 7/072; G05D 7/0688; G05D 7/0629
See application file for complete search history.

(56) References Cited

U.S. PATENT DOCUMENTS

| | | | |
|---|---|---|---|
| 1,808,209 A | | 6/1931 | Earl |
| 1,808,212 A | | 6/1931 | Earl |
| 2,302,529 A | | 11/1942 | Cornell et al. |
| 2,572,175 A | * | 10/1951 | McPherson ........... F16K 31/402 251/30.05 |
| 3,245,651 A | * | 4/1966 | Erickson ............. F16K 31/0658 251/129.17 |
| 3,254,660 A | | 6/1966 | Ray |
| 3,430,657 A | | 3/1969 | Junck et al. |
| 3,593,957 A | | 7/1971 | Dolter et al. |
| 3,653,261 A | | 4/1972 | Feldman |
| 3,672,233 A | | 6/1972 | Hjermstad |
| 3,729,026 A | | 4/1973 | Wilke |
| 3,731,534 A | | 5/1973 | Painley et al. |
| 3,795,144 A | | 3/1974 | Marchesi |
| 3,894,432 A | * | 7/1975 | Coughlin ................ G01F 15/00 210/136 |
| 4,508,136 A | * | 4/1985 | Kah, Jr. ................ F16K 31/402 137/217 |
| 4,901,751 A | | 2/1990 | Story |
| 4,953,403 A | | 9/1990 | Springer |
| 4,967,996 A | | 11/1990 | Sonoda et al. |
| 5,251,480 A | | 10/1993 | Brunson, IV et al. |
| 5,267,587 A | | 12/1993 | Brown |
| 5,519,387 A | | 5/1996 | Besier et al. |
| 5,540,347 A | | 7/1996 | Griffin |
| 5,546,801 A | | 8/1996 | Swinson |
| 5,767,790 A | | 6/1998 | Jovellana |
| 5,979,863 A | | 11/1999 | Lousberg |
| 5,986,573 A | | 11/1999 | Franklin et al. |
| 5,996,608 A | | 12/1999 | Hunter et al. |
| 6,069,571 A | | 5/2000 | Tell |
| 6,115,677 A | | 9/2000 | Perthold et al. |
| 6,150,955 A | | 11/2000 | Tracy et al. |
| 6,152,173 A | | 11/2000 | Makowan |
| 6,208,266 B1 | | 3/2001 | Lyons et al. |
| 6,237,618 B1 | | 5/2001 | Kushner |
| 6,325,099 B1 | | 12/2001 | Bunschoten et al. |
| 6,426,027 B1 | | 7/2002 | Scarborough et al. |
| 6,491,062 B1 | | 12/2002 | Croft |
| 6,536,469 B2 | | 3/2003 | Dilger et al. |
| 6,556,142 B2 | | 4/2003 | Dunstan |
| 6,568,416 B2 | | 5/2003 | Tucker |
| 6,618,709 B1 | | 9/2003 | Sneeringer |
| 6,657,552 B2 | | 12/2003 | Belski et al. |
| 6,701,956 B1 | | 3/2004 | Berger |
| 6,880,567 B2 | | 4/2005 | Klaver |
| 6,982,651 B2 | | 1/2006 | Fischer |
| 7,099,781 B1 | | 8/2006 | Heidl et al. |
| 7,111,817 B2 | | 9/2006 | Teti et al. |
| 7,143,645 B2 | | 12/2006 | Benson et al. |
| 7,228,726 B2 | | 6/2007 | Kates |
| 7,248,179 B2 | | 7/2007 | Smit |
| 7,250,874 B2 | | 7/2007 | Mueller et al. |
| 7,267,014 B2 | | 9/2007 | Winter |
| 7,304,587 B2 | | 12/2007 | Boaz |
| 7,349,766 B2 | | 3/2008 | Rodgers |
| 7,385,524 B1 | | 6/2008 | Orlosky |
| D583,692 S | | 12/2008 | Ball et al. |
| 7,533,693 B2 | | 5/2009 | Colton et al. |
| 7,549,439 B2 | | 6/2009 | Kimura et al. |
| 7,559,529 B2 | | 7/2009 | Affaticati et al. |
| 7,604,216 B2 | | 10/2009 | Gebler |
| 7,671,480 B2 | | 3/2010 | Pitchford et al. |
| 7,690,393 B2 | | 4/2010 | Nagle et al. |
| 7,694,934 B2 | | 4/2010 | Irwin |
| 7,740,024 B2 | | 6/2010 | Brodeur |
| 7,746,246 B2 | | 6/2010 | Salser |
| 7,775,422 B2 | | 8/2010 | Winter et al. |
| 7,806,382 B1 | | 10/2010 | Palumbo et al. |
| 7,817,063 B2 | | 10/2010 | Hawkins et al. |
| 7,825,793 B1 | | 11/2010 | Spillman et al. |
| 7,880,641 B2 | | 2/2011 | Parris et al. |
| 8,013,732 B2 | | 9/2011 | Petite et al. |
| 8,347,427 B2 | | 1/2013 | Klicpera |
| 8,516,925 B2 | | 8/2013 | Johnson et al. |
| 8,539,827 B2 | | 9/2013 | Benson et al. |
| 8,719,187 B2 | | 5/2014 | Milanes Garcia-Moreno |
| 8,776,593 B2 | | 7/2014 | Margalit et al. |
| 8,833,390 B2 | | 9/2014 | Ball et al. |
| 8,866,634 B2 | | 10/2014 | Williamson et al. |
| 8,911,191 B2 | | 12/2014 | James |
| 8,931,337 B2 | | 1/2015 | Renoud |
| 9,019,120 B2 | | 4/2015 | Broniak et al. |
| 9,061,307 B2 | | 6/2015 | Klicpera et al. |
| 9,254,499 B2 | | 2/2016 | Klicpera |
| 9,266,136 B2 | | 2/2016 | Klicpera |
| 9,297,150 B2 | | 3/2016 | Klicpera |
| 9,494,249 B2 | | 11/2016 | McCraven |
| 9,494,480 B2 | | 11/2016 | Klicpera |
| 9,749,792 B2 | | 8/2017 | Klicpera |
| 9,909,680 B2 | | 3/2018 | McCraven |
| 2003/0034900 A1 | | 2/2003 | Han |
| 2003/0076241 A1 | | 4/2003 | Middleton |
| 2004/0193329 A1 | | 9/2004 | Ransom et al. |
| 2005/0236594 A1 | | 10/2005 | Lilly et al. |
| 2005/0246295 A1 | | 11/2005 | Cameron |
| 2006/0012491 A1 | | 1/2006 | Mahowald |
| 2006/0059977 A1 | | 3/2006 | Kates |
| 2006/0137090 A1 | | 6/2006 | Jeffries et al. |
| 2006/0284784 A1 | | 12/2006 | Smith |
| 2007/0284293 A1 | | 12/2007 | Pitchford et al. |
| 2008/0061769 A1 | | 3/2008 | Junk et al. |
| 2008/0084260 A1 | | 4/2008 | Swartzentruber |
| 2008/0149180 A1 | | 6/2008 | Parris |
| 2008/0150750 A1 | | 6/2008 | Parris |
| 2008/0169910 A1 | | 7/2008 | Greene et al. |
| 2009/0058676 A1 | | 3/2009 | Orlosky |
| 2009/0070682 A1 | | 3/2009 | Dawes et al. |
| 2009/0153357 A1 | | 6/2009 | Bushman et al. |
| 2009/0164050 A1 | * | 6/2009 | Ahmad ................ G01F 1/6847 700/282 |
| 2009/0188313 A1 | | 7/2009 | Ball |
| 2009/0255346 A1 | | 10/2009 | Hendey et al. |
| 2009/0271045 A1 | | 10/2009 | Savelle |
| 2009/0322453 A1 | | 12/2009 | Kawaguchi |
| 2010/0060479 A1 | | 3/2010 | Salter |
| 2011/0035063 A1 | | 2/2011 | Palayur |
| 2011/0108136 A1 | | 5/2011 | Margalit et al. |
| 2011/0114202 A1 | | 5/2011 | Goseco |
| 2012/0068476 A1 | | 3/2012 | Bradfield |
| 2012/0068477 A1 | | 3/2012 | Bradfield |
| 2012/0193559 A1 | | 8/2012 | Benson et al. |
| 2012/0305084 A1 | | 12/2012 | Ball |
| 2013/0214883 A1 | | 8/2013 | Yano |

(56) References Cited

U.S. PATENT DOCUMENTS

2014/0338464 A1 11/2014 Ball
2015/0323091 A1 11/2015 McCraven
2017/0023146 A1 1/2017 McCraven
2018/0149283 A1 5/2018 McCraven

OTHER PUBLICATIONS

Ball, Marty Scott; Non-Final Office Action for U.S. Appl. No. 13/149,720, filed May 31, 2011, dated Mar. 11, 2014, 75 pgs.
Ball, Marty Scott; Notice of Allowance for U.S. Appl. No. 13/149,720, filed May 31, 2011, dated Jun. 24, 2014, 29 pgs.
Ball, Marty Scott; Supplemental Notice of Allowability for U.S. Appl. No. 13/149,720, filed May 31, 2011, dated Aug. 12, 2014, 4 pgs.
Ball, Marty Scott; Final Office Action for U.S. Appl. No. 14/451,896, filed Aug. 5, 2014, dated Oct. 14, 2016; 17 pgs.
Ball, Marty Scott; Non-Final Office Action for U.S. Appl. No. 14/451,896, filed Aug. 5, 2014, dated Mar. 18, 2016, 98 pgs.
Ball, Marty Scott; Non-Final Office Action for U.S. Appl. No. 14/451,896, filed Aug. 5, 2014, dated May 12, 2016; 15 pages.
Ball, Marty Scott; Non-Final Office Action for U.S. Appl. No. 14/451,896, filed Aug. 5, 2014, dated Feb. 27, 2017, 16 pgs.
Ball, Marty Scott; Mexico Office Action for serial No. MX/a/2012/006097, filed May 25, 2012, dated Mar. 19, 2015, 3 pgs.
Ball, Marty Scott; Mexico Office Action for serial No. MX/a/2012/006097, filed May 25, 2012, dated May 26, 2015, 5 pgs.
McCraven, Jeremy; Applicant Interview Summary for U.S. Appl. No. 14/273,823, filed May 9, 2014, dated Jan. 12, 2016, 3 pgs.
McCraven, Jeremy; Non-Final Office Action for U.S. Appl. No. 14/273,823, filed May 9, 2014, dated Dec. 8, 2015, 18 pgs.
McCraven, Jeremy; Non-Final Office Action for U.S. Appl. No. 14/273,823, filed May 9, 2014, dated Apr. 12, 2016, 86 pgs.
McCraven, Jeremy; Notice of Allowance for U.S. Appl. No. 14/273,823, filed May 9, 2014, dated Jul. 7, 2016, 10 pgs.
McCraven, Jeremy; Supplemental Notice of Allowability for U.S. Appl. No. 14/273,823, filed May 9, 2014, dated Aug. 9, 2016, 6 pgs.
McCraven, Jeremy; Supplemental Notice of Allowance for U.S. Appl. No. 14/273,823, filed May 9, 2014, dated Oct. 14, 2016; 4 pgs.
Ball, Marty Scott; Final Office Action for U.S. Appl. No. 14/451,896, filed Aug. 5, 2014, dated Sep. 7, 2017, 11 pgs.
McCraven, Jeremy; Non-Final Office Action for U.S. Appl. No. 15/288,156, filed Oct. 7, 2016, dated Jul. 24, 2017, 25 pgs.
Ball, Marty Scott; Non-Final Office Action for U.S. Appl. No. 14/451,896, filed Aug. 5, 2014; dated Jan. 16, 2018; 18 pgs.
McCraven, Jeremy; Corrected Notice of Allowance for U.S. Appl. No. 15/288,156, filed Oct. 7, 2016, dated Nov. 6, 2017, 5 pgs.
McCraven, Jeremy; Notice of Allowance for U.S. Appl. No. 15/288,156, filed Oct. 7, 2016, dated Oct. 27, 2017, 7 pgs.
McCraven, Jeremy; Response to Amendment under Rule 312 for U.S. Appl. No. 15/288,156, filed Oct. 7, 2016, dated Nov. 21, 2017, 2 pgs.
McCraven, Jeremy; Supplemental Notice of Allowance for U.S. Appl. No. 15/288,156, filed Oct. 7, 2016, dated Nov. 16, 2017, 4 pgs.
Ball, Marty Scott; Applicant-Initiated Interview Summary for U.S. Appl. No. 14/451,896, filed Aug. 5, 2014, dated May 17, 2018, 4 pgs.
Linkel, Scott; Office Action for Canadian application No. 2,777,973, filed May 23, 2012, dated Apr. 4, 2018, 4 pgs.
McCraven, Jeremy; Issue Notification for U.S. Appl. No. 15/288,156, filed Oct. 7, 2016, dated Feb. 14, 2018, 1 pg.
McCraven, Jeremy; Supplemental Notice of Allowance for U.S. Appl. No. 15/288,156, filed Oct. 7, 2016, dated Feb. 6, 2018, 4 pgs.
Ball, Marty Scott; Final Office Action for U.S. Appl. No. 14/451,896, filed Aug. 5, 2014, dated Aug. 10, 2018, 23 pgs.
Linkel, Scott; Office Action for Canadian application No. 2,777,973, filed May 23, 2012, dated Feb. 18, 2019, 5 pgs.
McCraven, Jeremy; Non-Final Office Action for U.S. Appl. No. 15/877,812, filed Jan. 23, 2018, dated Jun. 14, 2019, 45 pgs.
Ball, Marty Scott; Office Action for Mexico patent application No. MX/a/2015/013381, filed May 25, 2012, dated Oct. 9, 2019, 7 pgs.
Article entitled "Thermocouple Wire Report", located at <http://www.lieda.co.za/Wordpress/wp-content/uploads/reports/ThermocoupleWireReport.pdf>, webpage last updated on Apr. 8, 2004, 18 pgs.
Klicpera, Michael Edward; Petition for Ex Parte Reexamination of U.S. Pat. No. 8,347,427, filed Aug. 2, 2019, 516 pgs.
Klicpera, Michael Edward; Petition for Ex Parte Reexamination of U.S. Pat. No. 9,297,150, filed Aug. 2, 2019, 366 pgs.
Klicpera, Michael Edward; Petition for Ex Parte Reexamination of U.S. Pat. No. 9,749,792, filed Aug. 5, 2019, 587 pgs.
Mueller Systems, LLC; Petition for Inter Partes Review of U.S. Pat. No. 8,347,427, filed Oct. 29, 2019, 75 pgs.
Mueller Systems, LLC; Petition for Inter Partes Review of U.S. Pat. No. 9,297,150, filed Oct. 29, 2019, 89 pgs.
Mueller Systems, LLC; Petition for Inter Partes Review of U.S. Pat. No. 9,749,792, filed Oct. 29, 2019, 75 pgs.
New World Encyclodpedia; Article entitled: "Thermocouple", located at <https://web.archive.org/web/20081228234252/https://www.newworldencyclopedia.org/entry/Thermocouple>, archived webpage from Dec. 28, 2008, 5 pgs.
Pacific Gas and Electric Company; "Article entitled: SmartMeter System—How it Works", located at <https://web.archive.org/web/20100712031615/https:/www.pge.com/myhome/customerservice/smartmeter/howitworks/>, accessed on Oct. 24, 2019, 3 pgs.
The Free Dictonary; Article entitled: "Remotely", located at <https://web.archive.org/web/20080821060942/http://www.thefreedictionary.com/remotely>, archived webpage from Aug. 21, 2008, 3 pgs.
Wikipedia; Article entitle:"Flow Measurement", located at <https://web.archive.org/web/20071028063648/https://en.wikipedia.org/wiki/Flow_measurement>, archived webpage from Oct. 28, 2007, 4 pgs.
Wikipedia; Artivle entitled: "Pressure sensor", located at <https://web.archive.org/web/20071117202257/https://en.wikipedia.org/wiki/Pressure_sensor >, archived webpage from Nov. 17, 2007, 4 pgs.
McCraven, Jeremy; Non-Final Office Action for U.S. Appl. No. 15/877,812, filed Jan. 23, 2018, dated Jan. 15, 2020, 15 pgs.
Ball, Marty Scott; Office Action for Mexico patent application No. MX/a/2015/013381, filed May 25, 2012, dated Feb. 5, 2020, 7 pgs.

* cited by examiner

VALVE METER ASSEMBLY AND METHOD

REFERENCE TO RELATED APPLICATIONS

This application is a continuation of U.S. application Ser. No. 14/451,896, filed Aug. 5, 2014, which is a continuation of U.S. application Ser. No. 13/149,720, filed May 31, 2011, which issued into U.S. Pat. No. 8,833,390, on Sep. 16, 2014, each of which is hereby specifically incorporated by reference herein in its entirety.

TECHNICAL FIELD

The present disclosure relates to water control and metering, specifically water flow monitoring and control.

BACKGROUND

Water is typically supplied by a water provider which is usually a municipality. Water providers deliver water to businesses and individuals via piping systems. A piping system could be an upstream piping system, including a system to carry water from a water provider to a meter, or a downstream piping system, including a system to carry water from a meter to a user terminal. Because water providers typically sell water by unit volume, there exists a need to measure water flow to a user terminal to generate a water bill. As used herein, user terminal may include an individual residence, a place of business or any other point of termination of the water flow. Typically, a water meter will be placed in the water supply line between the water source and the user terminal to measure all water flowing to that user terminal. Meters are read and checked against prior readings to determine the total flow of water to the user terminal.

When a water user has not provided payment for water already used, it is typical in the industry for a water provider to discontinue supplying water to the user terminal associated with the water user. Typically, a water provider will install a manual water supply valve in the supply line in anticipation of the need to discontinue water supply. Although the valve may be operated rarely, a manual valve is standard equipment for water providers.

Typically, water meters are read manually by water meter readers who are employees or contractors of the water providers. Additionally, it is also typical that water supply valves are manually operated by employees or contractors of the water providers. These manual operations associated with providing water represent a significant cost of a typical water provider. With the advent of wireless technology, water providers have sought methods and systems for remote reading of water meters and/or remote control of water supply valves.

Mesh networks for remote reading of water meters exist currently. Systems for remotely controlling the water supply valve exist currently. However, these systems are often cumbersome to implement, requiring excavation and replacement of water supply lines to implement a remotely controlled water supply valve. Electronic remote control of valves and reading of meters has been implemented through wired connections. While wireless systems for controlling valves or for reading meters do exist, the cast ferrous materials used to make most water meter housings can interfere with wireless signals, so the wireless equipment often cannot be placed in close proximity to typical meter housings. Moreover, a remotely controlled valve typically involves a separate system and apparatus from a remotely readable water meter. Systems that integrate a shutoff valve and water meter together are often too large to be installed without excavation of the water supply lines and are typically difficult to service if parts fail. Some systems designed to fit into the standard water meter lay-length of a water meter provide inordinate head loss through the system and provide only remote control of the valve and no ability to read the meter remotely. Moreover, wireless water supply valves typically have relatively short operative lives because their operation requires large amounts of energy.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Disclosed is a valve meter device, a valve meter assembly, and a method for remotely reading a water meter and controlling a water supply valve. The valve meter device includes a water supply valve and a water meter dimensioned together to fit within a standard water meter lay-length with reduced head loss. The valve meter device includes a water meter and at least part of a water supply valve together in one housing.

In one embodiment, the valve meter device is capable of communicating with a remotely located communicator. The remotely located communicator may receive signals from the valve meter device, send signals to the valve meter device, or both send signals to and receive signals from the valve meter device.

Figure 1:
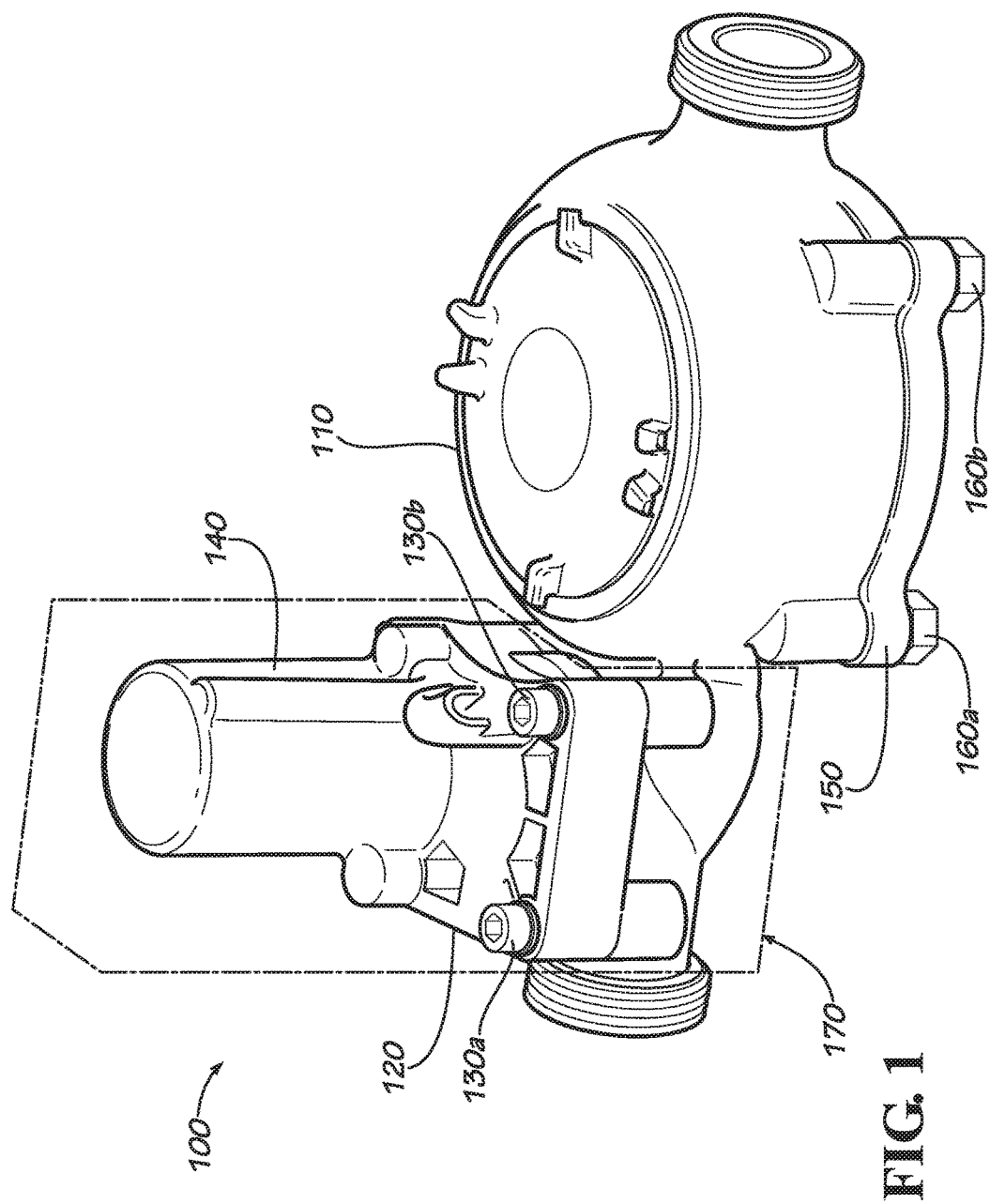
FIG. 1 is a perspective view of a valve meter device in accordance with one embodiment of the disclosure.

FIG. 1 is a perspective view of one embodiment of a valve meter device 100. The valve meter device 100 includes a device housing 110. The device housing 110 forms the main body through which water will flow. A valve cover 120 is attached to the device housing 110 using valve cover screws 130a,b (130c,d not shown). A solenoid tamper cover 140 is attached to the top of the valve cover 120. A bottom plate 150 is attached to the device housing 110 with bottom plate screws 160a,b (160c,d not shown). In this disclosure, references to "top", "bottom", "down", "up", "downward", or "upward" refer to the valve meter device 100 as oriented in FIG. 1. Various features of the valve meter device 100 may be altered, reoriented, reconfigured, replaced, rotated, or moved in alternative embodiments. No one configuration is intended to be limiting on this disclosure.

Figure 2:
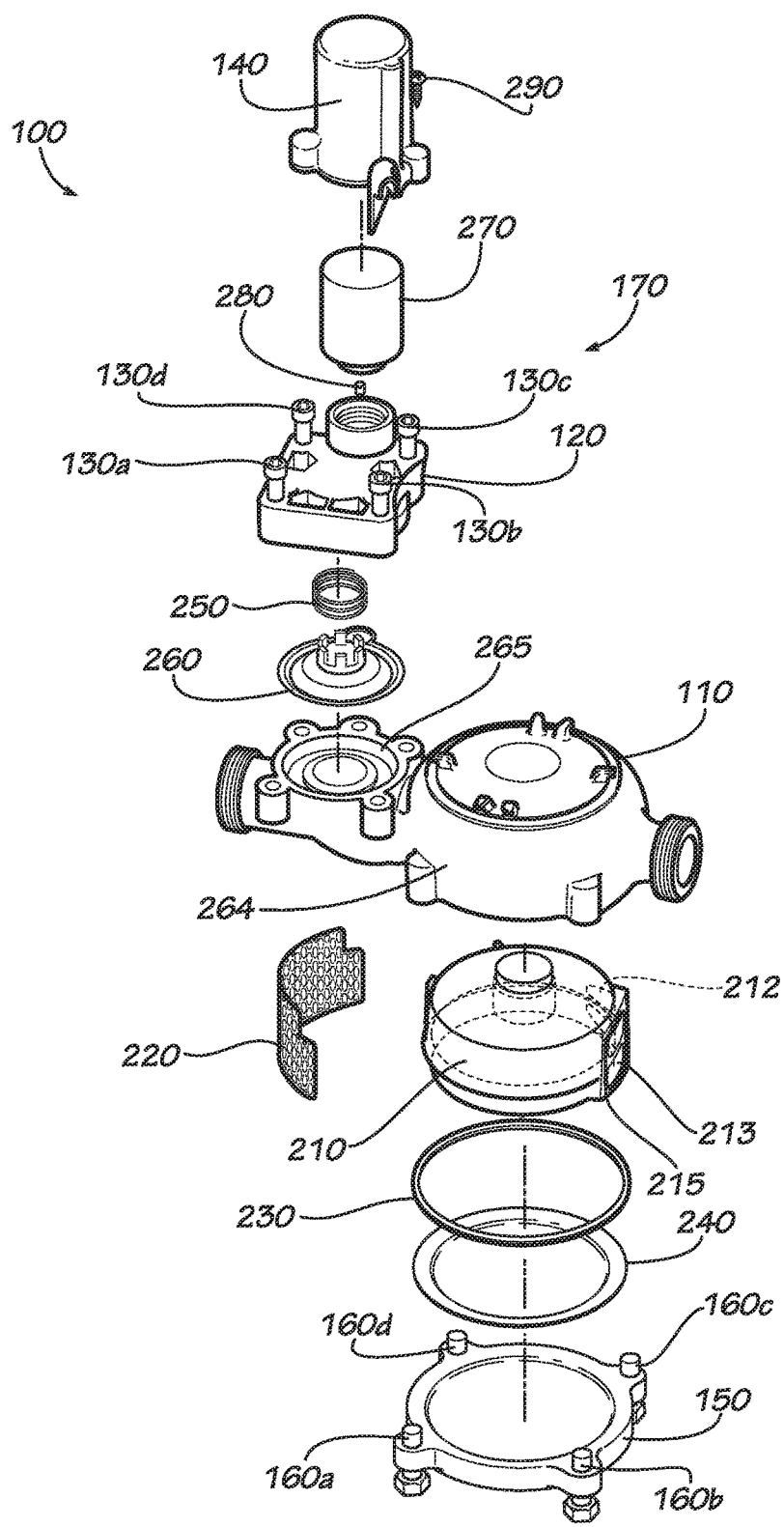
FIG. 2 is an exploded view of the valve meter device of FIG. 1.

The valve meter device 100 includes a water supply valve 170 and a water meter 210 (shown in FIG. 2). The water supply valve 170 is partially integrated with the device housing 110 and includes the valve cover 120 screwed onto the device housing 110 to enclose some components of the water supply valve 170 inside a cavity defined between the valve cover 120 and the device housing 110. Although the current embodiment includes a partially integrated construction with a separately attached cover, alternative embodiments are included in this disclosure and may include a plastic welded assembly, separate valve and device housing subassemblies connected together via plastic welding, or separate valve and device housing subassemblies connected together mechanically, among others.

FIG. 2 is an exploded view of the valve meter device 100. The device housing 110 includes a meter portion 264 and a valve portion 265. The device housing 110 and bottom plate 150 are configured to enclose a water meter 210 and a strainer retainer 220 in the meter portion 264. The bottom plate 150 is attached to the device housing 110 with bottom plate screws 160a-d. A meter gasket 230 is inserted between the bottom plate 150 and the device housing 110. A bottom plastic liner 240 is inserted between the bottom plate 150 and the device housing 110. The meter 210 in the current embodiment is a nutating disc displacement flow meter. Other meter types may be used with the valve meter device 100. The meter 210 has a metering inlet 212 and a metering outlet 213 located proximate to each other. The metering outlet 213 is surrounded by a metering outlet rubber gasket 215.

The valve cover 120 and the valve portion 265 of the device housing 110 enclose a spring 250 and a diaphragm assembly 260. The solenoid tamper cover 140 encloses a solenoid 270 and a valve orifice cylinder 280 onto the valve cover 120. The valve orifice cylinder 280 is a steel cylinder with a cylindrical bore extending its entire top to bottom length. The solenoid 270 is attached to the valve cover 120. The valve orifice cylinder 280 sits in a media channel 520 (seen in FIG. 5) and interacts with the solenoid 270 to change water flow through the media channel 520 when the solenoid 270 is placed in an "open" or a "closed" position. The valve orifice cylinder 280 has a cylindrical shape in the current embodiment, but the valve orifice cylinder 280 may be various shapes. A solenoid tamper cover screw 290 provides the attachment of the solenoid tamper cover 140 to the valve cover 120.

In alternative embodiments, the spring 250 may not be required for valve operation. Other parts of the water supply valve 170, including the solenoid tamper cover 140, may not be necessary in alternative embodiments of the valve meter device 100. The valve cover 120 and the valve portion 265 of the device housing 110 are screwed together to enclose the optional spring 250 and the diaphragm assembly 260 using valve cover screws 130a,b,c,d.

Figure 3:
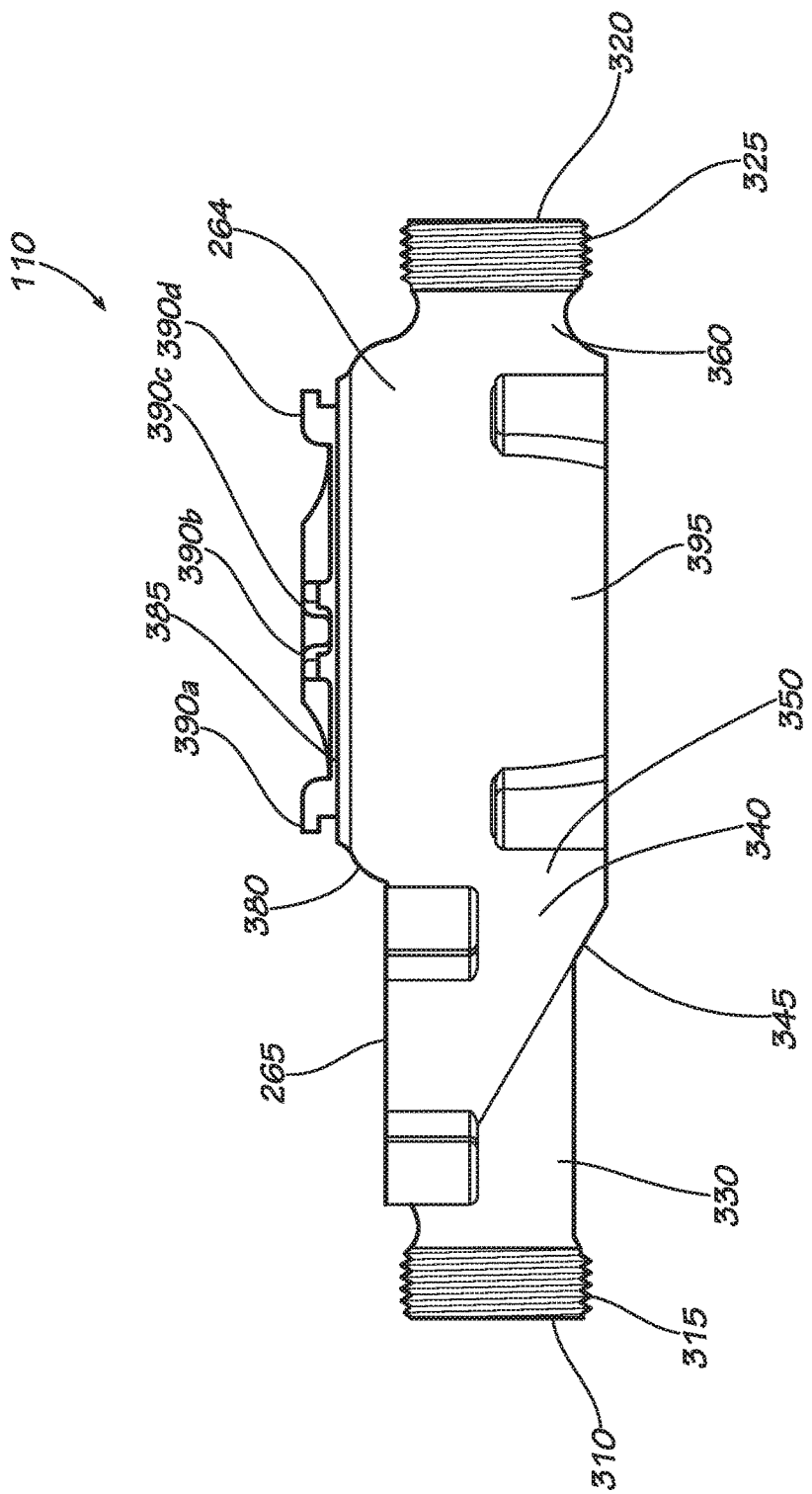
FIG. 3 is a side view of the device housing of the valve meter device of FIG. 1.

As illustrated in FIG. 3, the device housing 110 has an inlet 310 and an outlet 320. Water flows through the device housing 110 by flowing into the inlet 310 and the out of the outlet 320. The inlet 310 includes an inlet end 616 (shown in FIG. 6), an inlet threaded portion 315, an inlet neck 622 (shown in FIG. 6), and an inlet opening 612 (shown in FIG. 6). The outlet 320 includes an outlet end 618 (shown in FIG. 6), an outlet threaded portion 325, an outlet neck 624 (shown in FIG. 6), and an outlet opening 614 (shown in FIG. 6). The inlet threaded portion 315 and the outlet threaded portion 325 allow for attachment to a piping system, including an upstream piping system or a downstream piping system or both. The inlet opening 612 and outlet opening 614 are connected by a flow channel 691 (shown in FIG. 6) that extends from the inlet end 616 to the outlet end 618 and passes through the inside of the device housing 110. Water flows into the inlet 310 from a provider or water source and out of the outlet 320 to a home, office building, or other user terminal. Both the inlet 310 and the outlet 320 are attachable to the piping system via the inlet threaded portion 315 and outlet threaded portion 325, respectively, with a coupling nut (not shown).

FIG. 3 illustrates the valve portion 265 and meter portion 264 of the device housing 110. To reduce head loss, the water supply valve 170 (including the valve portion 265) and the meter 210 (placed in the meter portion 264) are oriented such that at least a portion of each of the water supply valve 170 and the meter 210 touch an imaginary line drawn between the inlet 310 and the outlet 320 thereby forming an "in line" configuration. The "in line" configuration is not achieved by staggering water supply valve 170 and the meter 210, as such staggering may result in unacceptable head loss. In the current embodiment, the maximum acceptable head loss is 6 psi at 20 gallons per minute, although other embodiments may include other limits. To avoid staggering of the water supply valve 170 and the meter 210, the "in line" configuration is achieved by using suitably sized components (such as valves adequately sized for rated pressure in the system and piping diameter not larger than necessary for required flow), reducing wall thicknesses of the housing, shortening features including the inlet 310 and outlet 320, and using water supply valve 170 with a coaxial valve inlet portion 330 and valve outlet portion 340. However, the "in line" configuration does not indicate that components of the valve meter device 100, including the meter 210 and water supply valve 170, are located along the same horizontal plane. Should components or features, including the water supply valve 170 and the meter 210, of the valve meter device 100 be staggered such that the components are not along the same horizontal plane, such a configuration typically is arranged to accommodate other requirements, such as an uneven piping system or multiple inlet or outlet configurations, and not to address the requirement of fitting the valve meter device 100 into a standard water meter lay-length.

Although the current embodiment has the valve portion 265 proximate the inlet 310 and the meter portion 264 proximate the outlet 320, the placement of these or other portions of the device housing 110 or the valve meter device 100 may be rearranged. As illustrated in FIG. 3 (as well as FIG. 6), the valve portion 265 includes a valve inlet portion 330 and a valve outlet portion 340 which overlap each other. Part of the valve inlet portion 330 is coaxial with part of the valve outlet portion 340 in the current embodiment. The valve outlet portion 340 has a slanted bottom portion 345 that is slanted from the inlet side of the water supply valve 170 to the outlet side of the water supply valve 170 to encourage water flow to the valve outlet portion 340. The slant helps reduce head loss by promoting consistent flow. A meter inlet portion 350 is attached to the valve outlet portion 340. The meter inlet portion 350 is also attached to the meter portion 264. A meter outlet portion 360 exists between the meter portion 264 and the outlet 320.

The inlet 310 and outlet 320 are portions of the device housing 110 in the current embodiment. In alternative embodiments, the inlet 310 and outlet 320 may be separate pieces connected to the device housing 110. The device housing 110 is dimensioned so that it can fit within a standard water meter lay-length. The standard water meter lay-length of a standard water meter is designated in various industry standards documents, including the American Water Works Association (AWWA). The AWWA C700 standard requires 7.5 inches standard water meter lay-length for meters with ⅝-inch piping diameter. Other AWWA standards, such as C708 and C710, also specify the same laying lengths for meters of like sizes.

A top portion 380 of the meter portion 264 includes a register connection interface 385. The register connection interface 385 includes several teeth 390a,b,c,d (390e,f shown in FIG. 5) designed to attach a separate register assembly 2210 (shown in FIG. 22) to the top portion 380. A bottom portion 395 of the meter portion 264 is configured to accept the bottom plate 150 attaching to the device housing 110. The bottom portion 395 and the bottom plate 150 may be connected via a threaded interaction, a screw and bore attachment, or a welded attachment, among others. For maximum wireless communication capabilities, the device housing 110 may be composed of brass, bronze, plastic, aluminum, or other non-ferrous material. The device housing 110 may also be made of ferrous materials based on the specific application.

Figure 4:
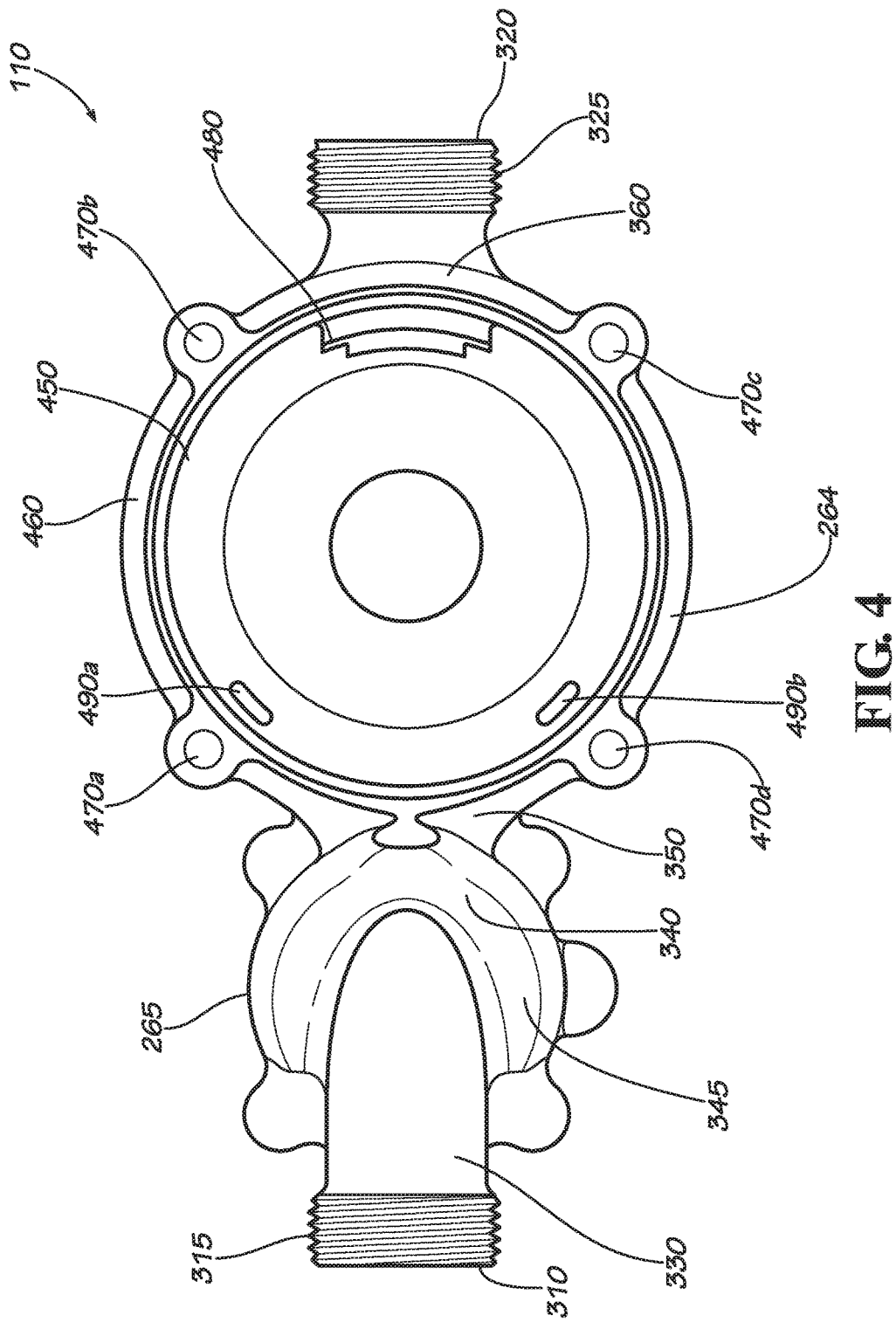
FIG. 4 is a bottom view of the device housing of FIG. 3.

FIG. 4 is a bottom view of the device housing 110, including the inlet 310, the valve inlet portion 330, the valve portion 265, the valve outlet portion 340, the meter inlet portion 350, the meter portion 264, the meter outlet portion 360, and the outlet 320.

The valve inlet portion 330 extends from the inlet neck 622 (not shown) to the valve outlet portion 340. The valve inlet portion 330 terminates inside the valve outlet portion 340 on a concentric profile, as illustrated in later figures.

The meter portion 264 of the device housing 110 is sized to define a meter cavity 450. Although the current embodiment of the meter portion 264 is cylindrical, the meter portion 264 need not be a specific shape, but need only accommodate the meter 210. Wall 460 of the meter portion 264 is sized to accommodate the water pressure of the piping system. The meter portion 264 also includes four threaded bottom plate attachment bores 470a,b,c,d for attachment of the bottom plate 150 with the bottom plate screws 160a,b,c,d (as seen in FIG. 2).

Inside the meter cavity 450 of the device housing 110, a meter outlet standoff 480 is shaped to accommodate the metering outlet rubber gasket 215 of the meter 210 to seal the connection (as seen in FIG. 2). Meter cavity standoffs 490a,b are also provided in the meter cavity to prevent the meter from jostling under the flow of water and to retain the strainer retainer 220 in position between the meter inlet portion 350 and the meter 210.

Figure 5:
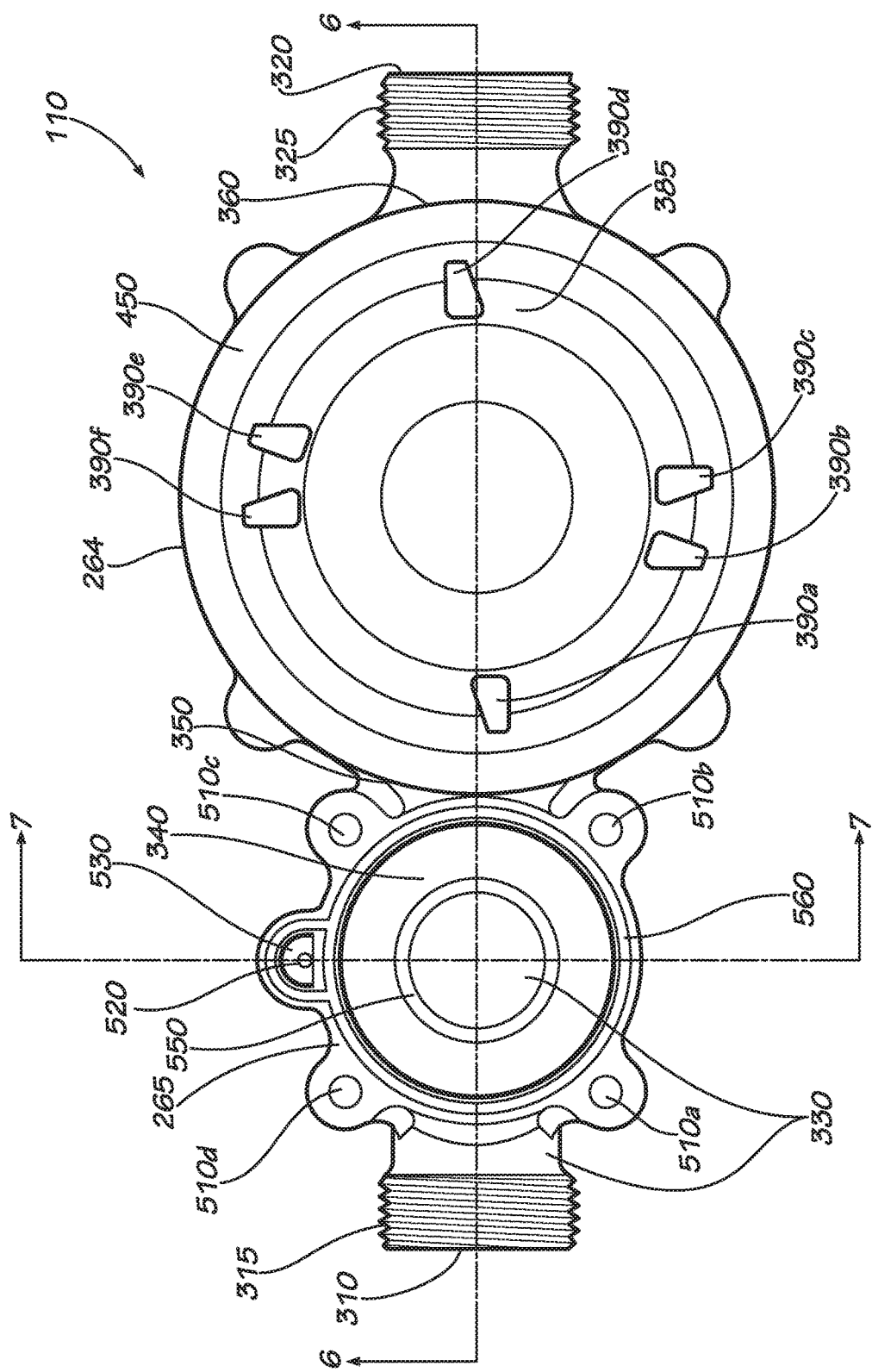
FIG. 5 is a top view of the device housing of FIG. 3.

Turning to FIG. 5, the valve portion 265 includes four threaded valve cover bores 510a,b,c,d for attachment of the valve cover 120 to the valve portion 265 of the device housing 110. In the current embodiment, the valve cover 120 is attached using four valve cover screws 130a,b,c,d (shown in FIGS. 1 and 2) that attach through the valve cover 120 to each valve cover bore 510a,b,c,d. As noted above, the attachment could also be achieved using welding, which would obviate any need for valve cover bores 510a,b,c,d or valve cover screws 130a,b,c,d. The valve portion 265 of the device housing 110 also includes a media channel 520 which is a bore that extends from the valve outlet portion 340 to a media channel relief 530 in the device housing 110. A diaphragm ring recess 560 lines the top of the valve portion 265 and the media channel relief 530. The beveled edge 550 seals the water supply valve 170 in operation.

Figure 6:
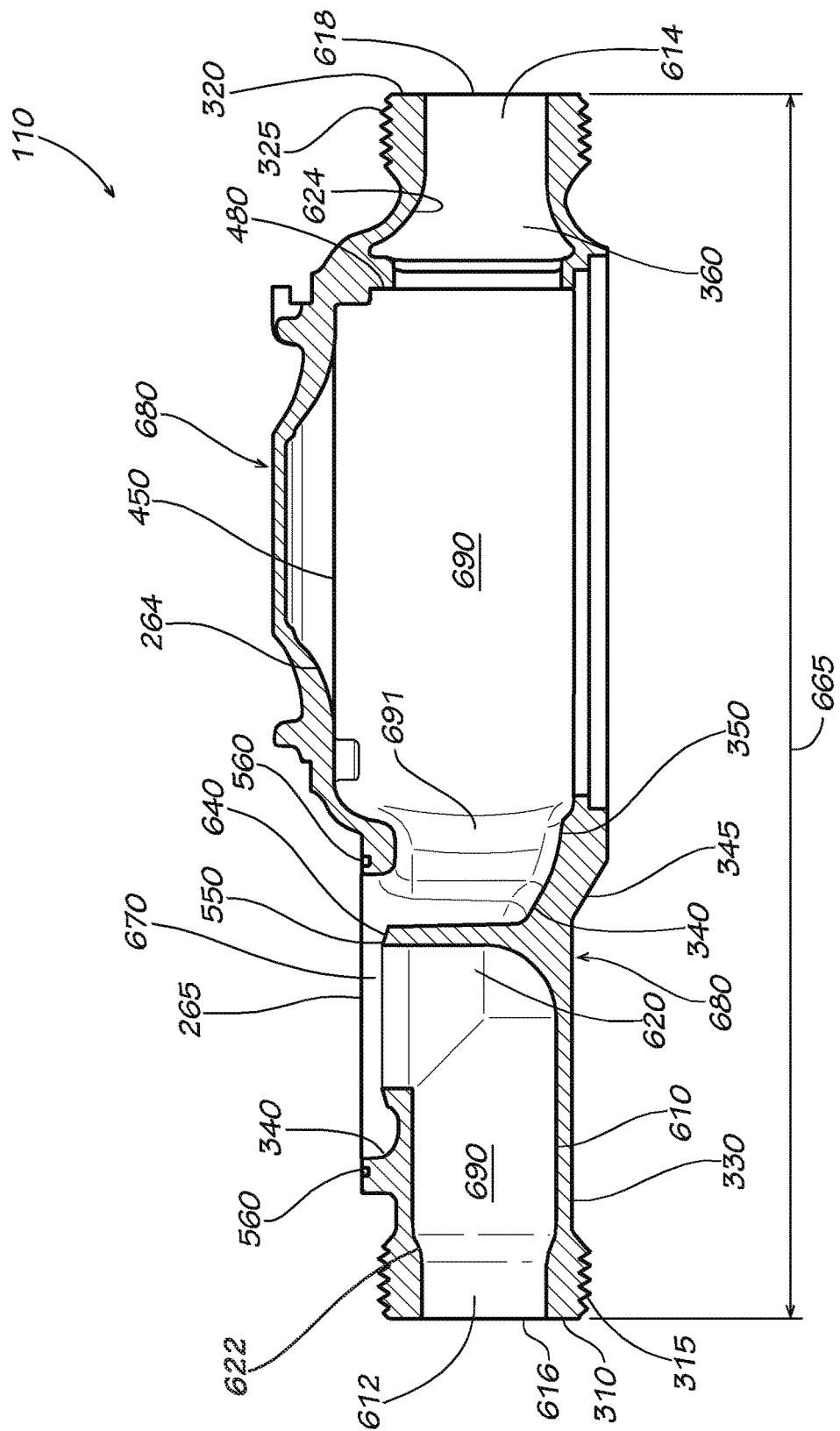
FIG. 6 is a sectional view of the device housing of FIG. 5 taken in a plane indicated by line 6 in FIG. 5.

As illustrated in the embodiment in FIG. 6, the valve inlet portion 330 communicates with the inlet neck 622 of the device housing 110. In one embodiment, the valve inlet portion 330 has an inner diameter sized larger than the inner diameter of the inlet neck 622 to reduce head loss through the water supply valve 170. The valve outlet portion 340 communicates with the meter inlet portion 350 of the device housing 110. The valve portion 265 includes the valve inlet portion 330 and the valve outlet portion 340 and all related transitional portions. In the current embodiment, the valve portion 265 is integrated with the device housing 110. However, alternative embodiments are contemplated herein, including separate housing units for the valve portion 265 and the meter portion 264 which are mechanically joined.

As illustrated in FIG. 6, a linear distance 665 exists between inlet end 616 and outlet end 618 of the device housing 110. In the current embodiment, linear distance 665 is 7.5 inches to comply with American Water Works Association standard AWWA C700. The flow channel 691 in the device housing 110 extends from the inlet end 616 to the outlet end 618.

The valve inlet portion 330 includes a horizontal portion 610 and a vertical portion 620. In the current embodiment, the horizontal portion 610 and vertical portion 620 form a right angle, although other angular configurations are acceptable and are contemplated by this disclosure. The horizontal portion 610 extends from the inlet 310 to a location proximate to the center of the water supply valve 170. At this location, the horizontal portion 610 merges into the vertical portion 620. The vertical portion 620 extends vertically inside the valve outlet portion 340. The valve outlet portion 340 of the device housing 110 includes the slanted bottom portion 345. The slanted bottom portion 345 of the valve outlet portion 340 directs water to the meter inlet portion 350 of the device housing 110. It should be noted that the configuration of inlets and outlets may be reversed in other embodiments. For example, the valve inlet portion 330 may be positioned on the outside of the valve outlet portion 340 in an alternative embodiment, whereas the valve outlet portion 340 is positioned on the outside of the valve inlet portion 330 in the current embodiment. A top edge portion 640 of the valve inlet portion 330 includes the beveled edge 550. The valve portion 265 of the device housing 110 also includes the diaphragm ring recess 560. A valve transition portion 670 allows the merger of the valve inlet portion 330 to the valve outlet portion 340.

As illustrated in FIG. 6, the device housing 110 has an outer surface 680 and an inner surface 690. At the water supply valve 170, the valve inlet portion 330 transitions to the valve outlet portion 340 having the valve cover 120 (see FIG. 25) placed over the valve transition portion 670. The meter cavity 450 and the bottom plate 150 enclose the meter 210 (see FIG. 25). The inner surface 690 defines the flow channel 691 in the device housing 110. The water supply valve 170 is also in sealable communication with the flow channel 691.

In one embodiment of the valve meter device 100, the meter inlet portion 350 is substantially rectangular to reduce head loss as water flows out of the valve outlet portion 340, through the meter inlet portion 350, and into the meter cavity 450. Reduced head loss is achieved because the rectangular cross-section provides a larger cross-section through which water may flow than a rounded cross-section.

Figure 7:
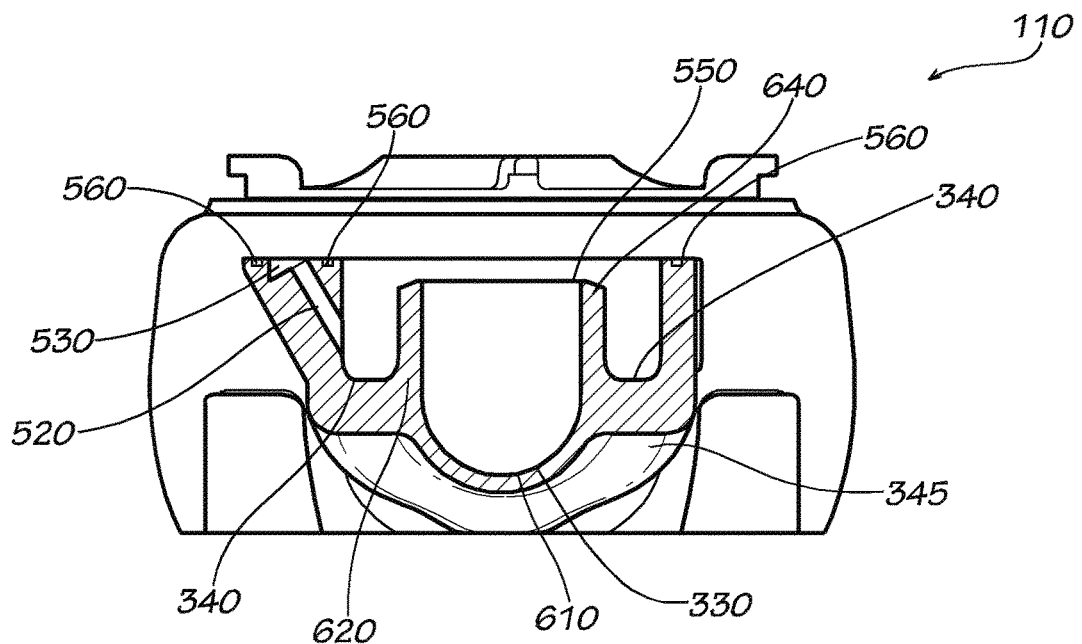
FIG. 7 is a sectional view of the valve portion of the device housing of FIG. 5 taken in a plane indicated by line 7 in FIG. 5.

The sectional view of device housing 110 shown in FIG. 7 illustrates the placement of the media channel 520 that exists between the media channel relief 530 and the valve outlet portion 340.

Figure 8:
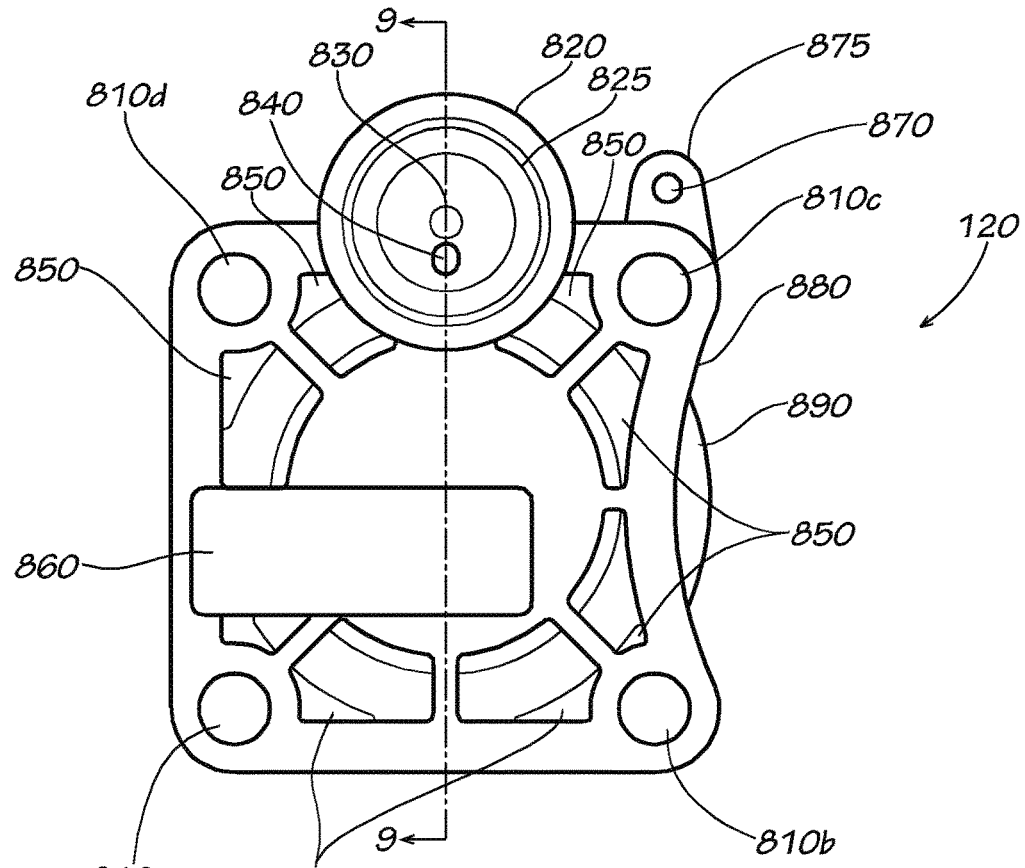
FIG. 8 is a top view of the valve cover of the valve meter device of FIG. 1.

FIG. 8 is a top view of the valve cover 120. Four screw bores 810a,b,c,d are located at the corners of the valve cover 120. A solenoid attachment portion 820 is a cylindrical boss including a threaded solenoid attachment sink 825 on the inside of the boss. A valve cover media channel 830 is aligned with the center of the solenoid attachment sink 825. The valve cover media channel 830 passes through the valve cover 120 and aligns with the media channel 520 when the valve meter device 100 is assembled. A valve cavity media channel 840 is also shown in the solenoid attachment portion 820. The valve cover 120 in the current view of the current embodiment also includes casting recesses 850 and a serial plate 860. A threaded solenoid cover screw bore 870 is located in a protrusion 875. Although the valve cover 120 is rectangular in shape, one side of the valve cover 120 includes a curve 880. The curve 880 is included to provide clearance for the register assembly 2210 to be placed on the valve meter device 100. A countercurve protrusion 890 is proximate the bottom of the curve 880 to accommodate the diaphragm ring recess 560.

Figure 9:
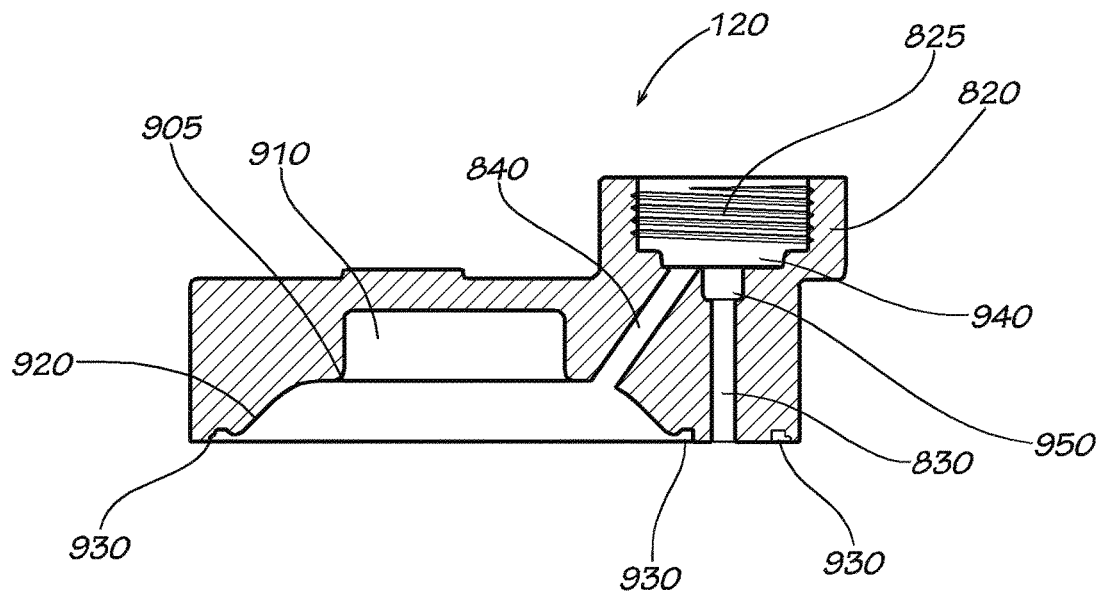
FIG. 9 is sectional view of the valve cover of FIG. 8 taken in a plane indicated by line 9 in FIG. 8.

As illustrated in the section view of the valve cover 120 in FIG. 9, the valve cover 120 includes a valve cavity 905. The valve cavity 905 and the valve portion 265 enclose components of the diaphragm assembly 260. The valve cavity 905 and the valve portion 265 may also enclose the spring 250. The valve cavity 905 also includes a valve recess 910 and a valve bonnet 920, which together are shaped to accept the diaphragm assembly 260 and the spring 250. The valve cover 120 also includes a diaphragm ring recess 930 shaped to align with the diaphragm ring recess 560.

Figure 10:
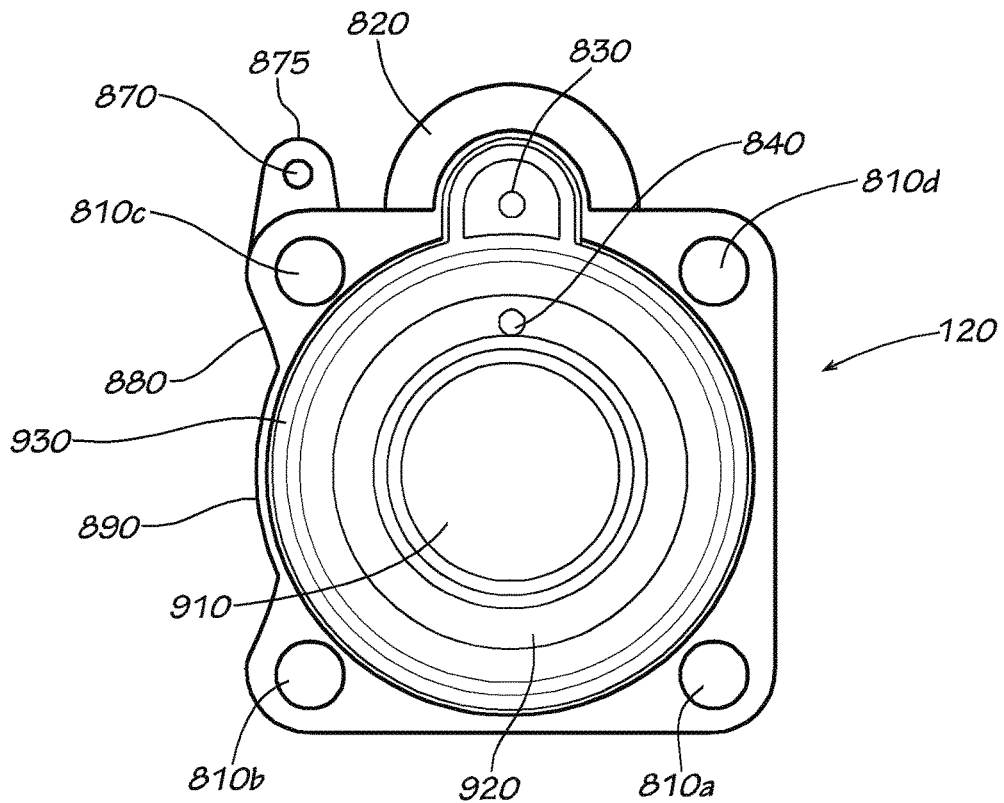
FIG. 10 is a bottom view of the valve cover of FIG. 8.

The solenoid attachment portion 820 is dimensioned to define a solenoid chamber 940 between the solenoid 270 and the valve cover 120 when the solenoid 270 is attached to the valve cover 120. The valve cavity media channel 840 connects the valve cavity 905 with the solenoid chamber 940. Although the valve cavity media channel 840 is shown to connect with the valve bonnet 920 in the current embodiment, the valve cavity media channel 840 may connect to any portion of the valve cavity 905, including the valve recess 910. Because the valve cover media channel 830 is aligned with the center of the solenoid attachment portion 820, the valve cover media channel 830 connects to the solenoid chamber 940. A valve orifice recess 950 is also seen in the valve cover media channel 830 to accommodate the valve orifice cylinder 280. When the valve meter device 100 is assembled, the valve orifice cylinder 280 is placed into the valve orifice recess 950. FIG. 10 is a bottom view of the valve cover 120.

Figure 11:
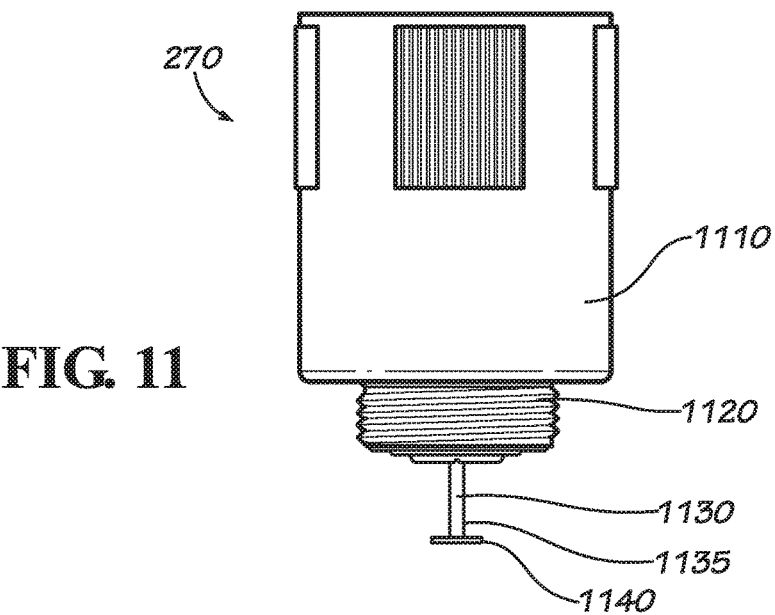
FIG. 11 is a side view of the solenoid of the valve meter device of FIG. 1.

FIG. 11 shows the solenoid 270 of the valve meter device 100. The solenoid 270 includes a solenoid body 1110, a threaded attachment portion 1120, and a plunger 1130. The plunger 1130 includes a shaft portion 1135 and an interface portion 1140. Although the solenoid in the current embodiment is designed to be attached via threaded interaction, other attachment means are contemplated, including glue, welding, and screw bore attachments among others. The solenoid tamper cover 140 covers the solenoid 270 when the valve meter device 100 is assembled. When the valve meter device 100 is assembled, the interface portion 1140 of the plunger 1130 may contact and seal the valve orifice cylinder 280, as will be described later.

Figure 12:
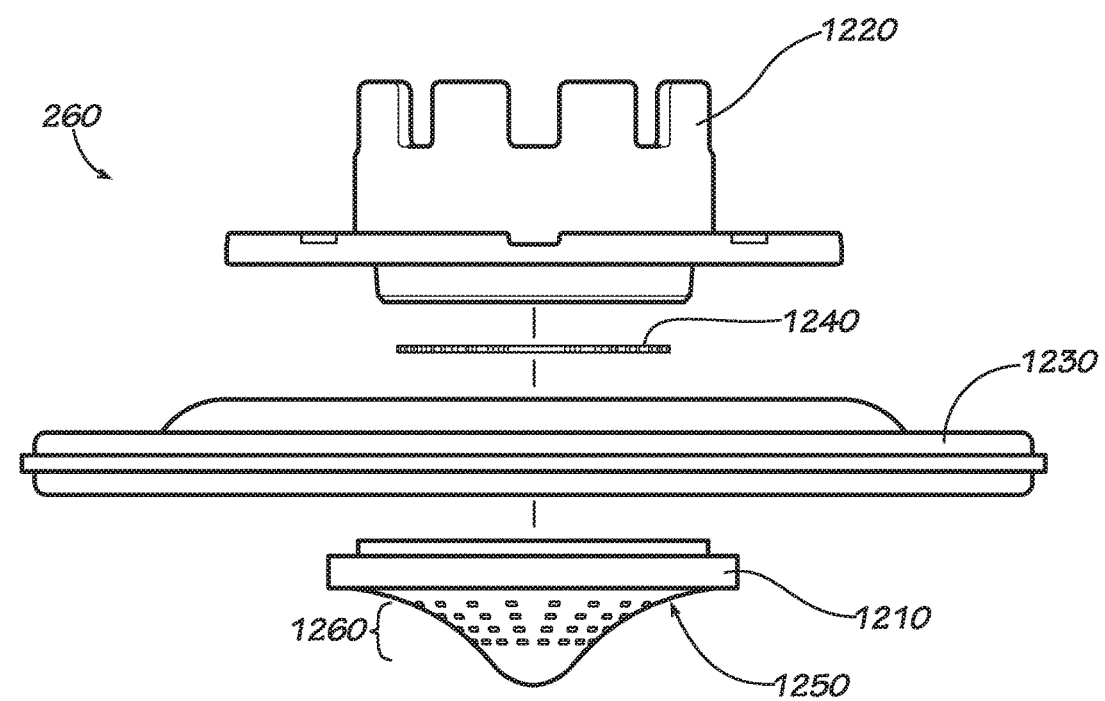
FIG. 12 is an exploded view of the diaphragm assembly of the valve meter device of FIG. 1.

FIG. 12 is an exploded view of the diaphragm assembly 260. The diaphragm assembly 260 includes a valve cone 1210, a backing plate 1220, a diaphragm 1230, and a strainer 1240. The strainer 1240 is a disc-shaped piece of straining material that traps impurities as water flows through the component. The strainer may be removed in alternative embodiments.

The valve cone 1210 is a conical-shaped plastic piece placed on the bottom side of the diaphragm 1230. The valve cone 1210 is plastic because it is plastic welded in the assembly of the current embodiment. However, other joining interfaces which would invoke other possible material choices for the valve cone 1210 are contemplated by this disclosure. The valve cone 1210 is cone-shaped on an outer, downward-facing surface 1250. The downward facing surface 1250 in the current embodiment is curved. However, the downward facing surface 1250 may be straight in alternative embodiments. The downward facing surface 1250 includes multiple water leak passthroughs 1260.

Figure 13:
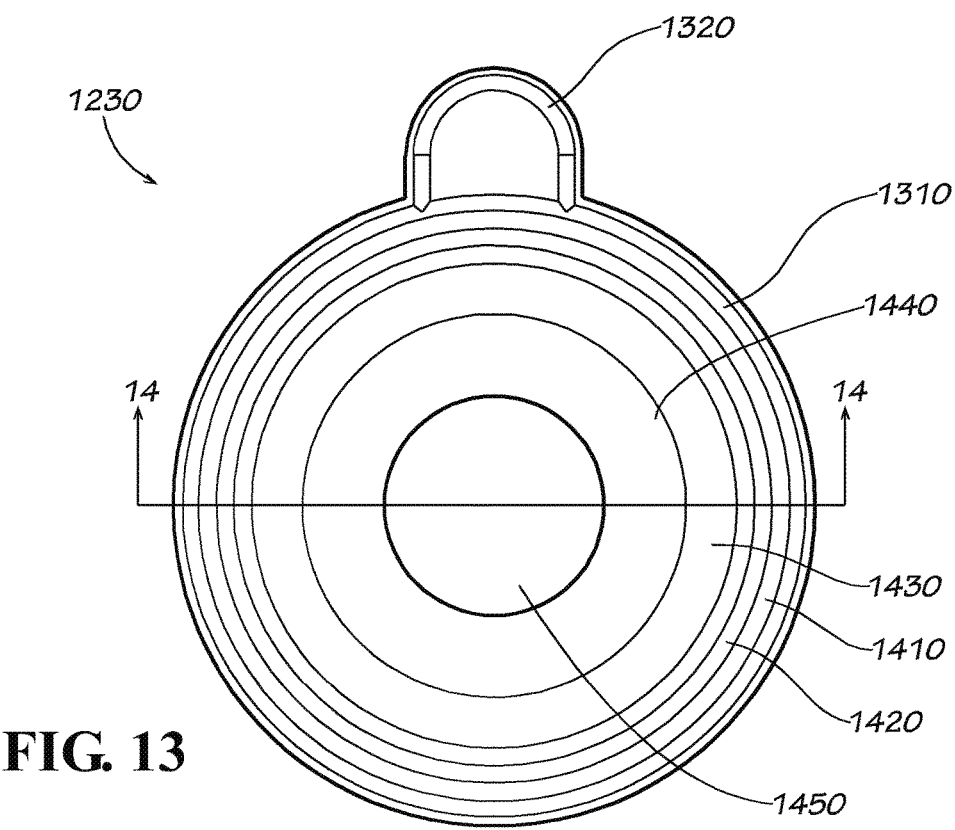
FIG. 13 is a top view of the diaphragm of the diaphragm assembly of FIG. 12.

FIG. 13 is a top view of the diaphragm 1230. The diaphragm 1230 may be made of a flexible material. In the current embodiment the diaphragm 1230 is made of rubber. The flexibility of the diaphragm 1230 allows travel of the central portions (1410,1420,1430,1440,1450, described later) without movement of the edge portions (1310,1320, described later) as achieved by multiple wrinkled or corrugated portions (1410,1420,1430, described later) that may be stretched to achieve a desired throw. The diaphragm 1230 includes a gasketing diaphragm ring 1310. A media channel seal ring 1320 is a looping portion of the diaphragm 1230 extending radially outward. The media channel seal ring 1320 is configured to seal the interface between the valve cover media channel 830 and the media channel 520.

Figure 14:
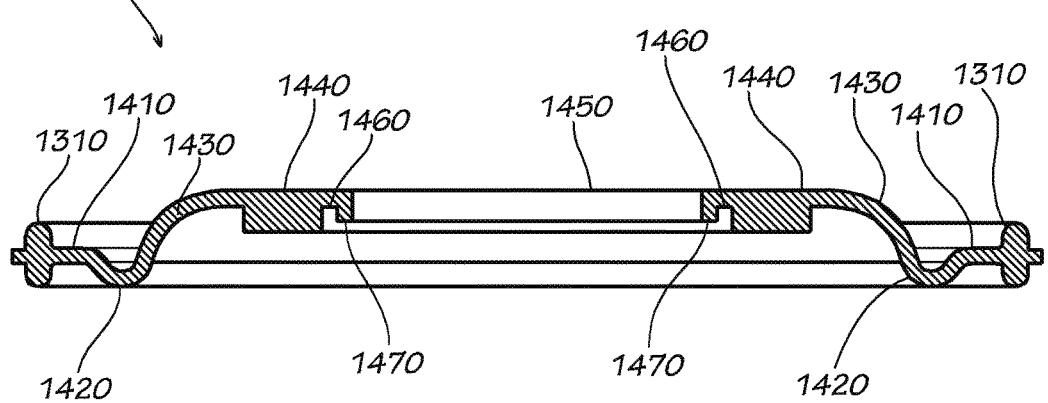
FIG. 14 is a sectional view of the diaphragm of FIG. 13 taken in a plane indicated by line 14 in FIG. 13.

FIG. 14 is a sectional view of the diaphragm 1230. The gasketing diaphragm ring 1310 is on the outer edge of the diaphragm 1230. Radially inward adjacent to the gasketing diaphragm ring 1310 is an attached outer flat portion 1410. Radially inward adjacent to the outer flat portion 1410 is a forward throw corrugation 1420. As shown, the forward throw corrugation 1420 is a rounded, semi-circular portion. Radially inward adjacent to the forward throw corrugation 1420 is a rearward throw corrugation 1430. The rearward throw corrugation 1430 is a rounded, quarter-circular portion. Radially inset to the rearward throw corrugation 1430 is an inner flat portion 1440. The inner flat portion 1440 defines a valve cone bore 1450. The inner flat portion 1440 defines a valve cone groove 1460. The valve cone groove 1460 interfaces with the valve cone 1210. Further inset radially from the valve cone groove 1460 is a valve cone retainer 1470. The valve cone retainer 1470 interfaces with the inside of the valve cone 1210. As stated above, the media channel seal ring 1320 is not concentric because it extends radially outward. Although all components of the diaphragm are connected and integrated in the current embodiment, alternative embodiments may include separate pieces that may or may not be joined together. For example, the gasketing diaphragm ring 1310 may be a separate component in alternative embodiments.

Figure 15:
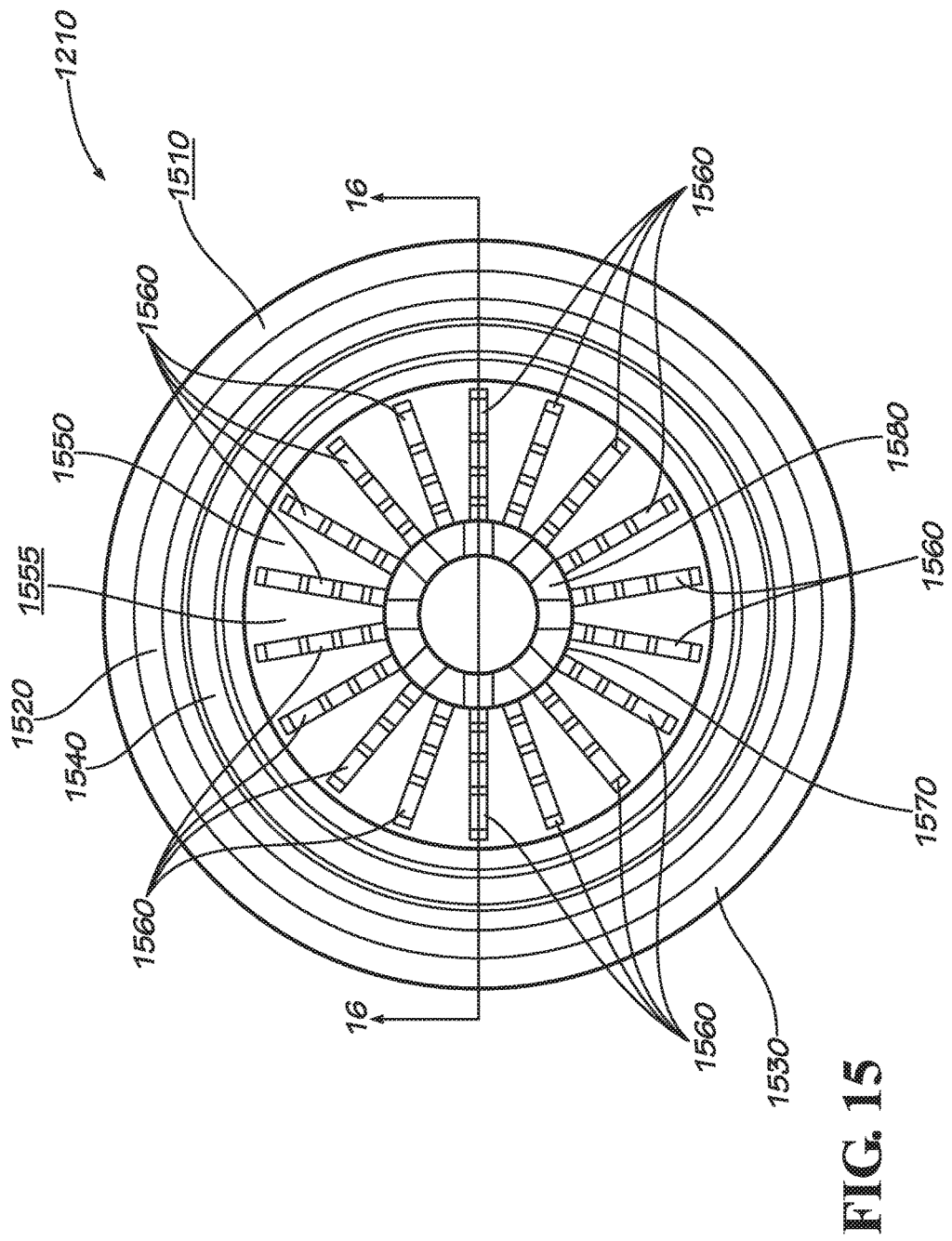
FIG. 15 is a top view of the valve cone of the diaphragm assembly of FIG. 12.

FIG. 15 illustrates a top view of the valve cone 1210. The valve cone 1210 has three main circular channel portion cutouts. A diaphragm retention channel 1520 is bounded by a shoulder 1530 that interfaces with the valve cone groove 1460. Inset radially from the diaphragm retention channel 1520, a weld channel 1540 provides a welding interface with the backing plate 1220. Inset radially from the weld channel 1540, a water leak channel 1550 includes features (described below) that communicate water from the valve inlet portion 330 to the valve cavity 905. On the inner surface 1555 of the water leak channel 1550, eighteen water subchannels 1560 are spaced twenty degrees apart circumferentially about the center axis of the valve cone 1210. The number of subchannels and the configuration of pathways may change in alternative embodiments. In the center of the valve cone 1210 is a cylindrical standoff 1570. The cylindrical standoff 1570 has multiple fins 1580 located at its top.

Figure 16:
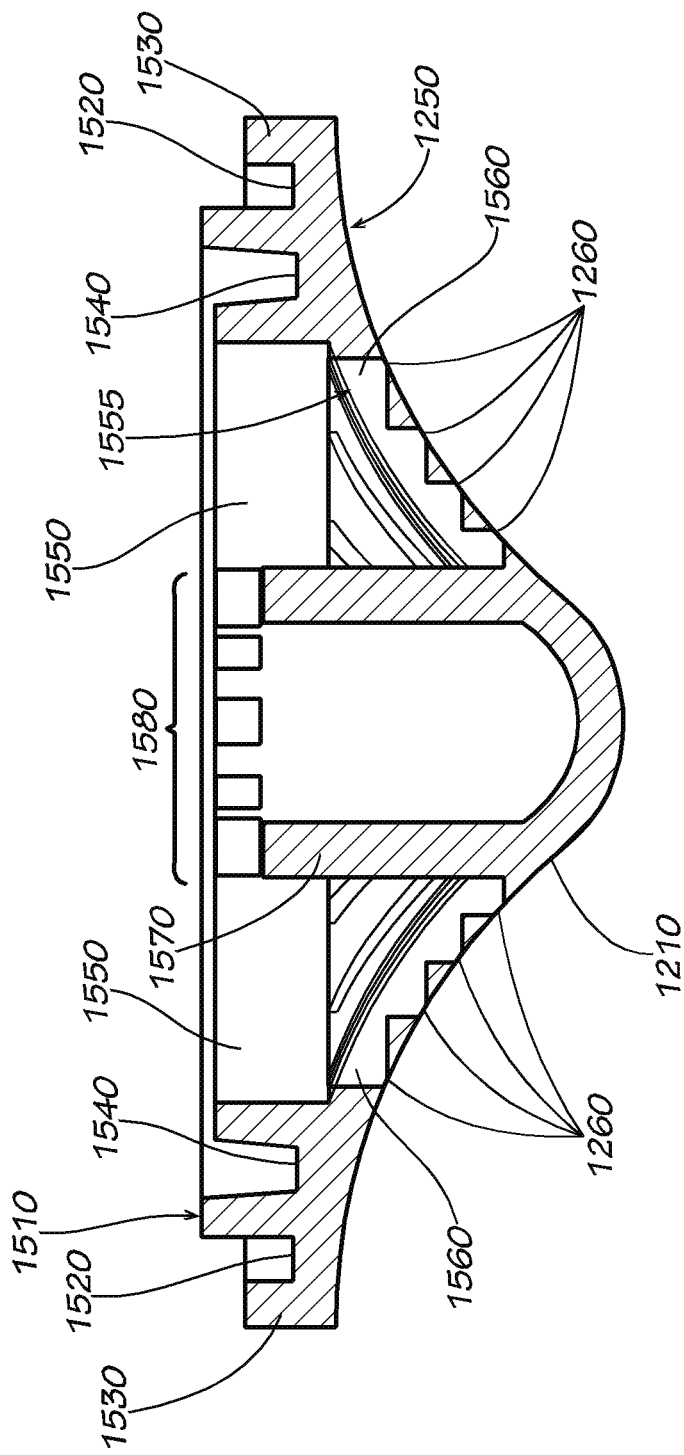
FIG. 16 is a sectional view of the valve cone of FIG. 15 taken in a plane indicated by line 16 in FIG. 15.

FIG. 16 shows a sectional view of the valve cone 1210. The surface profile of the inner surface 1555 is complementary to the surface profile of the downward facing surface 1250, providing a consistent wall thickness of the valve cone 1210 in that region. The depth of the water subchannels 1560 varies across each channel. A "stair step" depth pattern defines four water leak passthroughs 1260 per water subchannel 1560. In total, seventy-two water leak passthroughs 1260 are assembled in groups of four spaced twenty degrees apart around the downward facing surface 1250. The specific configuration of water leak passthroughs 1260 may be varied in alternative embodiments.

Figure 17:
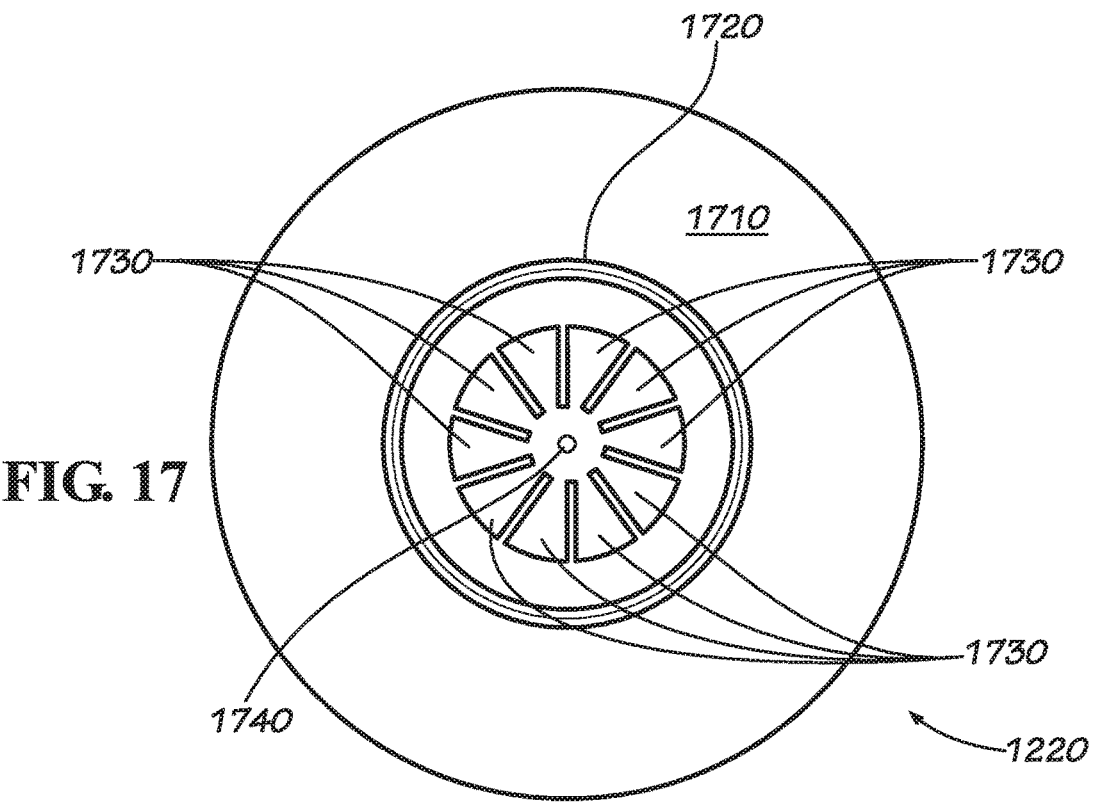
FIG. 17 is a bottom view of the backing plate of the diaphragm assembly of FIG. 12.

FIG. 17 shows a bottom view of the backing plate 1220. The backing plate 1220 includes a downward facing surface 1710 and an upward facing surface 1810 (shown in FIG. 18). The downward facing surface 1710 has a cylindrical weld portion 1720 where the backing plate 1220 will weld to the valve cone 1210. Ten flow path portions 1730 are wedge-shaped cutouts in the downward facing surface. The specific number or shape of flow path portions may vary in alternative embodiments. The wedge-shaped cutouts 1730 prevent the strainer 1240 from becoming pushed flush against the backing plate 1220. This allows water to flow through the diaphragm assembly 260. A water leak hole 1740 is in the center of the backing plate 1220 to allow the flow of water through the backing plate 1220.

Figure 18:
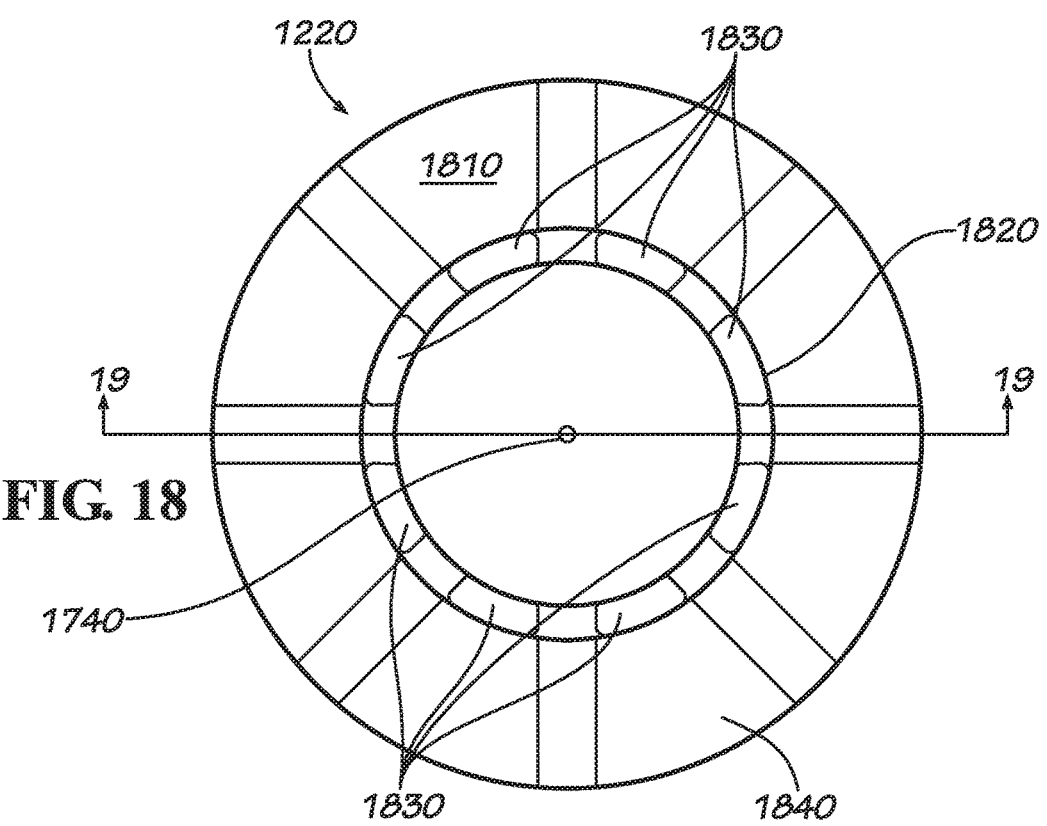
FIG. 18 is a top view of the backing plate of FIG. 17.

FIG. 18 is a top view of the backing plate 1220. The upward-facing surface 1810 includes a cylindrical spring portion 1820 sized to accommodate the optional spring 250 placed around it. The top of the cylindrical spring portion 1820 includes a fence 1830. The fence 1830 operates to preserve water flow above the cylindrical spring portion 1820 and below the valve cover 120. This space allows water to flow through the cylindrical spring portion 1820 into the valve bonnet 920. The upward-facing surface 1810 includes several wedge-shaped standoffs 1840. The wedge-shaped standoffs 1840 prevent the backing plate 1220 from becoming affixed by vacuum to the valve cover 120 in the valve recess 910.

Figure 19:
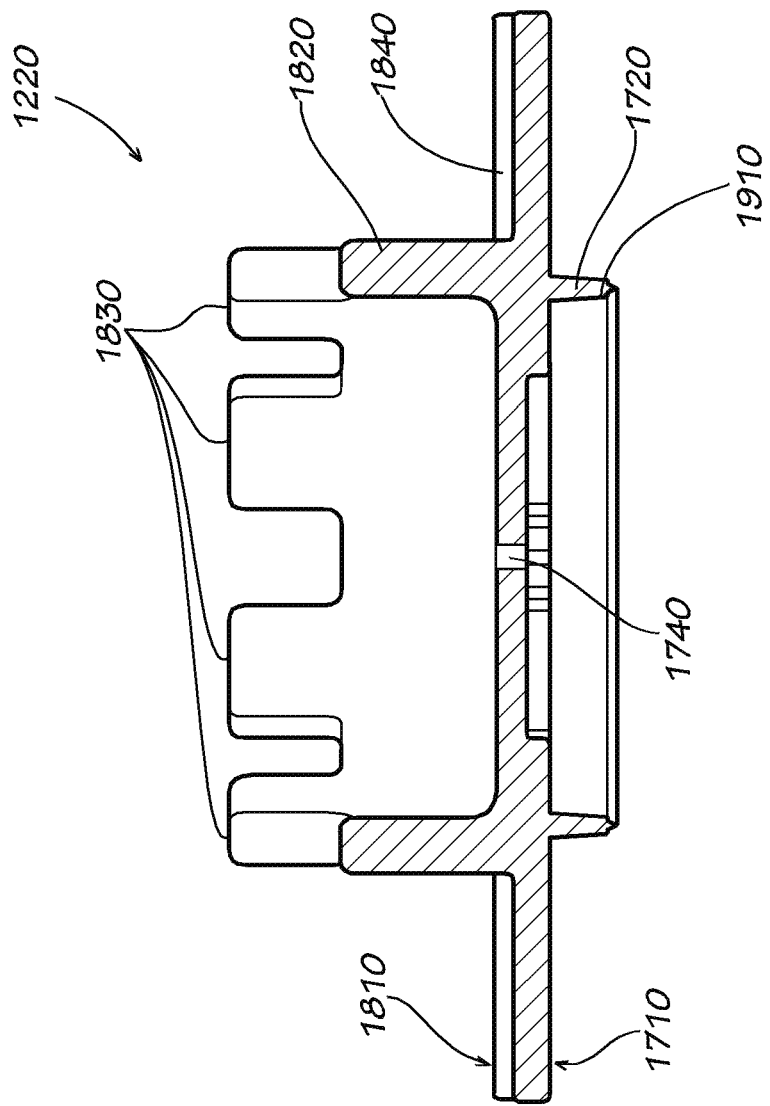
FIG. 19 is a sectional view of the backing plate of FIG. 17 taken in a plane indicated by line 19 in FIG. 18.

FIG. 19 is a sectional view of the backing plate 1220. The cylindrical weld portion 1720 includes a weld edge 1910 that is sharpened to provide a welding interface between the backing plate 1220 and the valve cone 1210.

Figure 20:
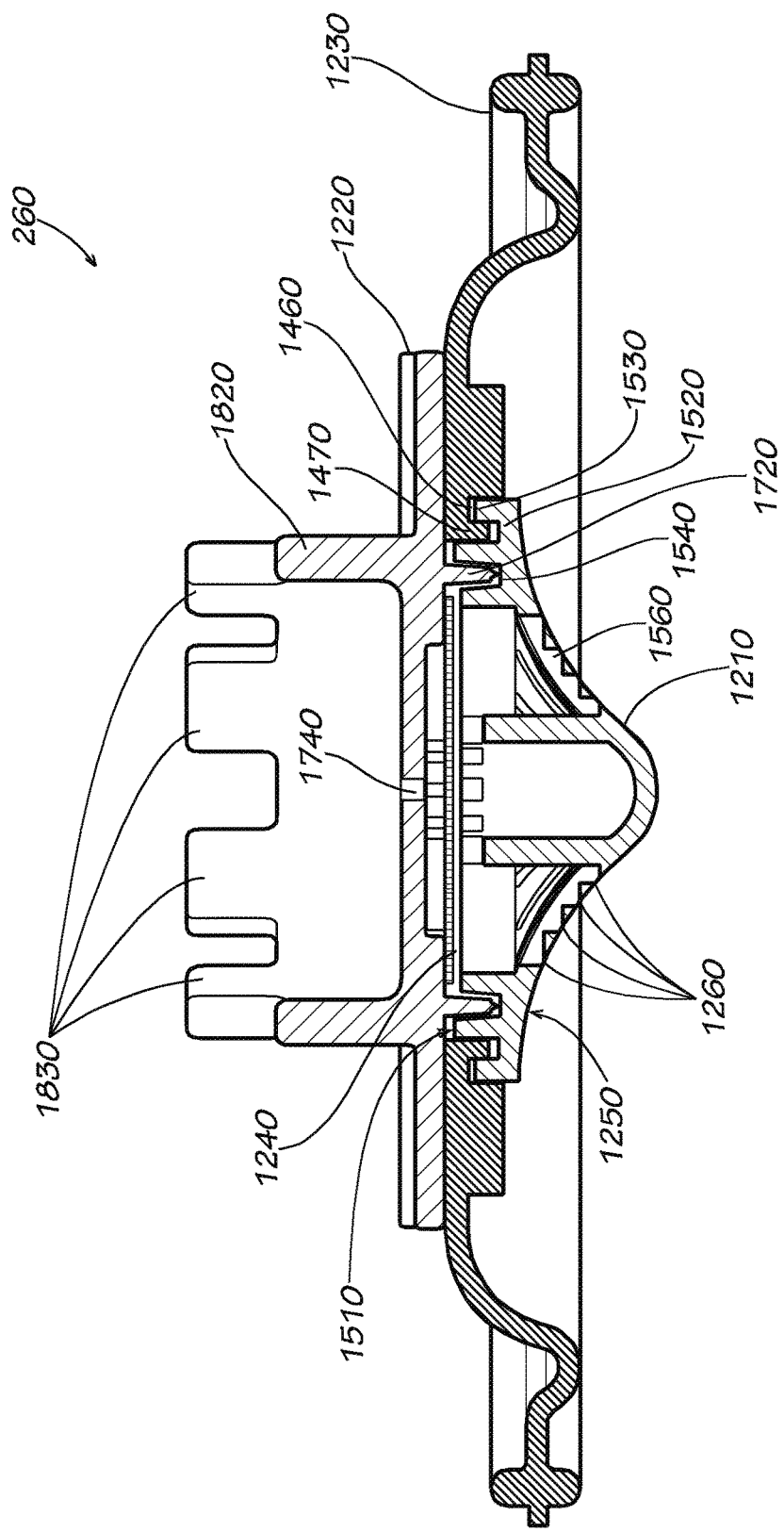
FIG. 20 is a sectional view of the diaphragm assembly of the valve meter device of FIG. 1 taken in a plane proceeding over the diameter of the assembly.

FIG. 20 displays a sectional view of the diaphragm assembly 260. The diaphragm assembly 260 includes the valve cone 1210 having its downward facing surface 1250 facing down and its upward facing surface 1510 facing up. The diaphragm 1230 is placed onto the valve cone 1210 with the diaphragm retention channel 1520 interfacing with the valve cone retainer 1470. The shoulder 1530 is interfacing with the valve cone groove 1460. The strainer 1240 is circular with perforations to allow water to flow through while trapping impurities. The strainer 1240 is centered on the valve cone 1210. The backing plate 1220 is placed over the strainer 1240 and onto the valve cone 1210 and diaphragm 1230. The cylindrical weld portion 1720 extends into the weld channel 1540 where it is welded with the valve cone 1210. When the backing plate 1220 is welded to the valve cone 1210, the diaphragm assembly 260 is complete with the strainer 1240 trapped inside the valve cone 1210 and the backing plate 1220 weld and the diaphragm 1230 trapped between the valve cone 1210 and the backing plate 1220. Welding provides a water-tight seal between the valve cone 1210 and the backing plate 1220.

Figure 21:
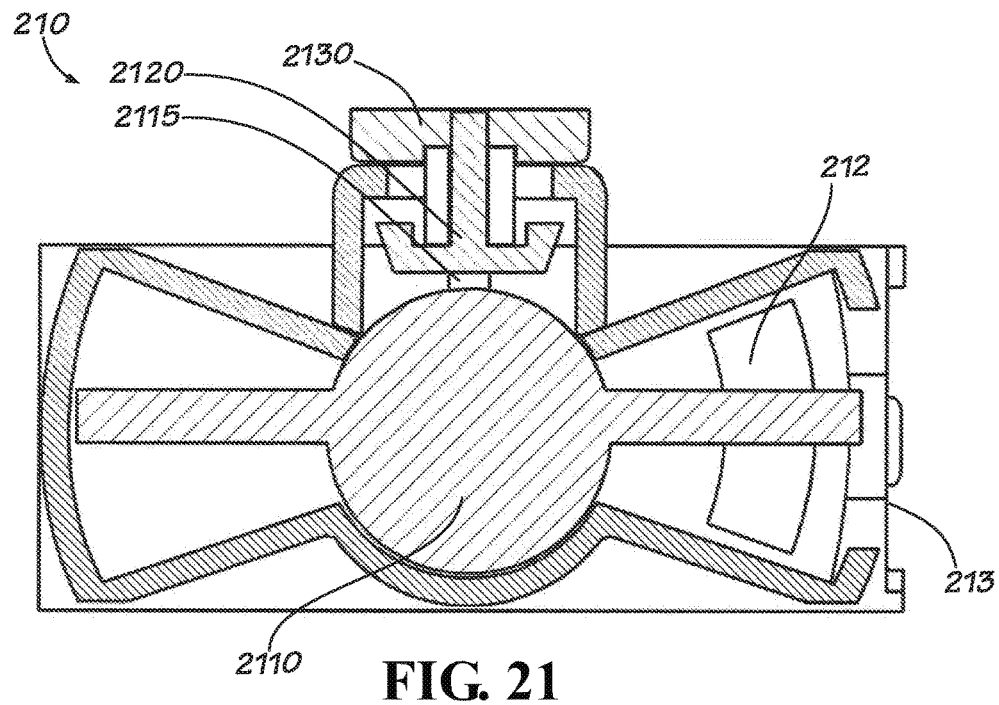
FIG. 21 is a sectional view of the water meter of the valve meter device of FIG. 1 taken in a plane proceeding through the center axis of the flow path of water through the valve meter device FIG. 1.

FIG. 21 displays the meter 210. The meter 210 is a standard nutating disc displacement flow meter. Other meters may also be used in lieu of the nutating disc displacement flow meter. Internal to the meter is a nutating disc 2110 that interfaces with an output register interaction shaft 2120. The nutating disc 2110 includes a disc pin 2115 which engages the output register interaction shaft 2120. In operation, the nutating disc 2110 and disc pin 2115 wobble about a fixed point in the meter to drive the output register interaction shaft 2120. The output register interaction shaft 2120 is attached to a meter magnet 2130. The meter magnet 2130 has a four-pole arrangement that coordinates with a register 2220 (shown in FIG. 22) such that when the meter magnet 2130 turns the register 2220 logs the motion and provides a readout of water usage. It should be noted that any descriptions related to the functioning of the meter 210 and its interaction with any register 2220 are related to one embodiment of the invention, and other types of meters and registers may be used with the current and alternative embodiments of the disclosed device.

Figure 22:
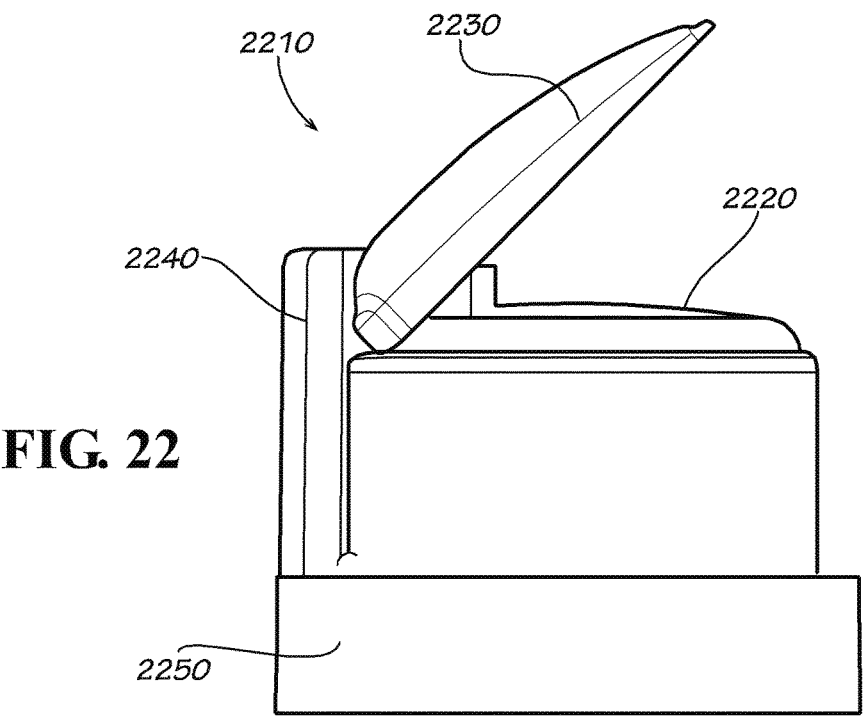
FIG. 22 is a side view of a register assembly included in accord with one embodiment of the valve meter device of FIG. 1.

As seen in FIG. 22, the register assembly 2210 includes the register 2220, a register cover 2230, a register bracket 2240, and a housing attachment ring 2250. The register 2220 is a magnetic interface register that interfaces with the meter 210 via a magnetic pole arrangement. The register 2220 has internal components and is externally made of glass or clear plastic having an external shape that is cylindrical. The housing attachment ring 2250 is a ring sized to encircle the register 2220. The housing attachment ring 2250 has clamping teeth (not shown) that interface with the teeth 390a,b, c,d,e,f of the device housing 110 to clamp the register assembly 2210 onto the device housing 110. The housing attachment ring 2250 is placed onto the register 2220 by inserting it over the top of the register 2220 and sliding it to the bottom of the register 2220. Other means of attaching the register 2220 and register assembly 2210 to the device housing 110 are intended to be included within this and alternative embodiments.

Figure 23:
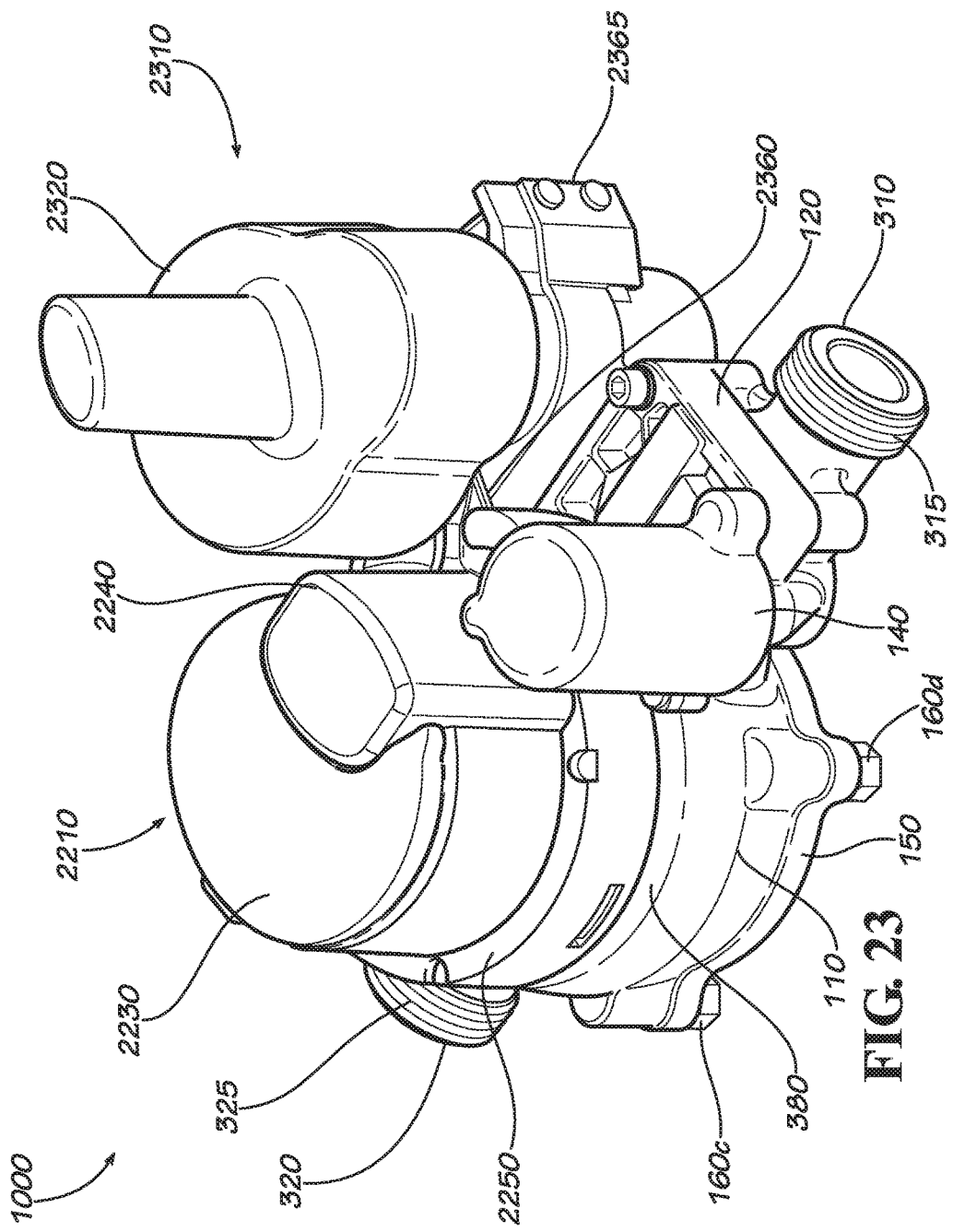
FIG. 23 is a perspective view of a valve meter assembly including the valve meter device of FIG. 1, the register assembly of FIG. 22, and a wireless communication unit included in accord with one embodiment of the disclosure.

In a valve meter assembly 1000, the register assembly 2210 is connected to the top 380 of the device housing 110, as shown in FIG. 23. In an embodiment of the valve meter assembly 1000, a communication device is included with the valve meter assembly 1000. The communication device in some embodiments may be a wireless communication unit 2310. In the current embodiment, the wireless communication unit 2310 is part of a mesh network where the mesh network includes the remotely located communicator. The remotely located communicator may be operated by a municipality, a technician, a service provider, or another entity. The remotely located communicator may be any communication device or system including a computer, a server, a gateway, another valve meter assembly, a handheld device, a mesh network, or any other device or system capable of communicating with the wireless communication unit 2310. A bracket 2365 is provided for attachment of the wireless communication unit 2310. In the valve meter assembly 1000, the bracket 2365 is integrated with register bracket 2240 as an arm of the register bracket 2240, although the bracket 2365 may be connected to, integrated with, or attached to other features of the valve meter assembly 1000.

Figure 24:
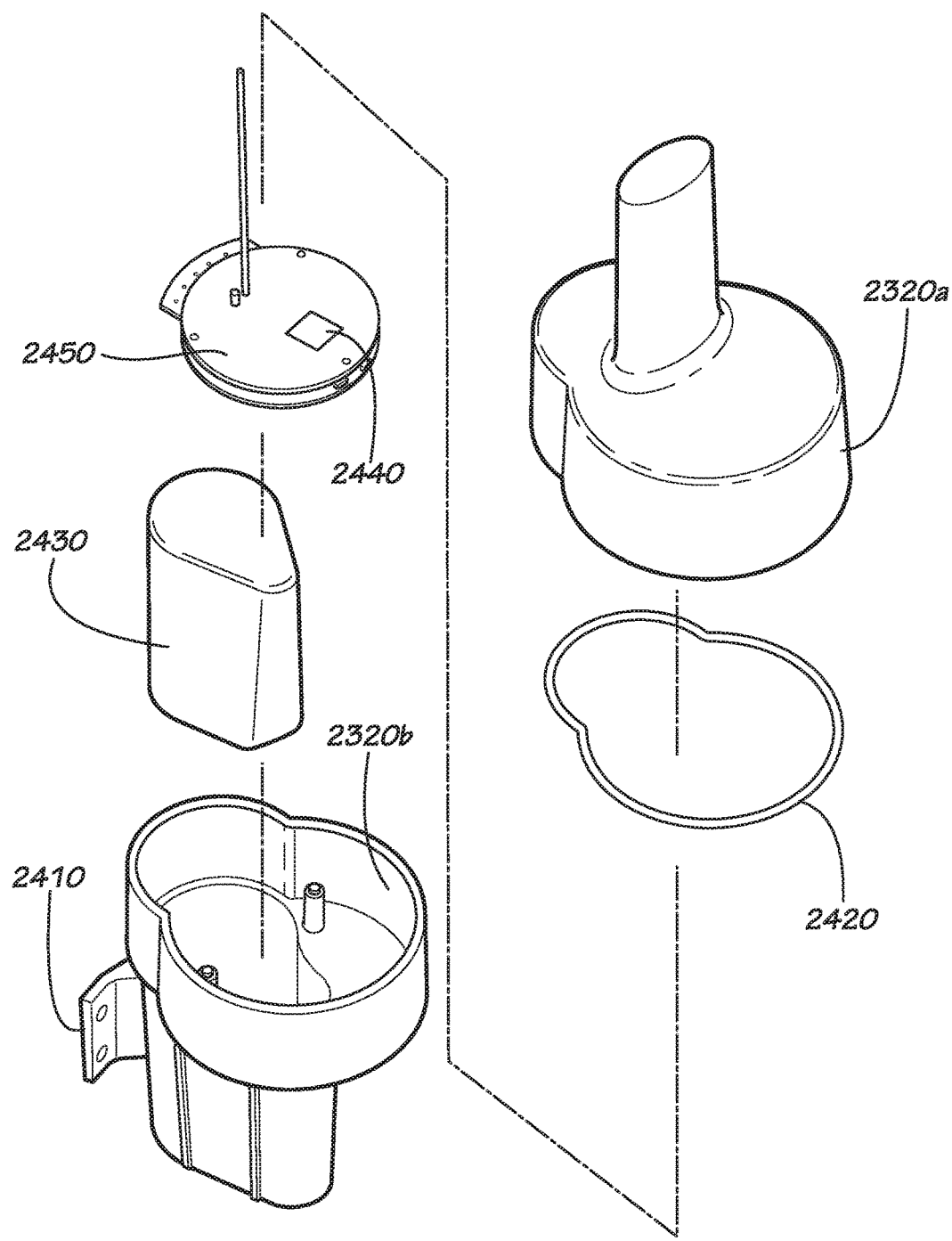
FIG. 24 is an exploded view of the wireless communication unit of the valve meter device of FIG. 23.

The wireless communication unit 2310 is shown in exploded view in FIG. 24. The wireless communication unit 2310 has a two-part plastic cover 2320 having a top 2320a and a bottom 2320b. The plastic cover 2320a,b includes a bracket attachment portion 2410 for attachment to the bracket 2365 (shown in FIG. 23) that may be included with the valve meter assembly 1000 to attach the wireless communication unit 2310. Enclosed within the plastic cover 2320a,b is a sealing gasket 2420, a battery 2430, a transceiver 2440, and a printed circuit board (PCB) 2450. Where a "printed circuit board" or PCB is included in the current description, any circuitry which functions as the PCB is intended to be included in alternative embodiments as a variant of a printed circuit board.

In an embodiment of the valve meter assembly 1000, the wireless communication unit 2310 may receive signals from the remotely located communicator, or send signals to the remotely located communicator, or both. The wireless communication unit 2310 may include a wireless communication unit circuit 2925 (shown in FIG. 29) as part of the PCB 2450. The wireless communication unit circuit 2925 receives signals from the remotely located communicator. The signals may include valve control signals. The valve control signals may direct action of the solenoid 270 to open or to close and, thereby, to change the state of the water supply valve 170. The wireless communication unit circuit 2925 controls the solenoid 270 in the current embodiment; however, alternative embodiments may include other control circuits for the solenoid 270.

Figure 29:
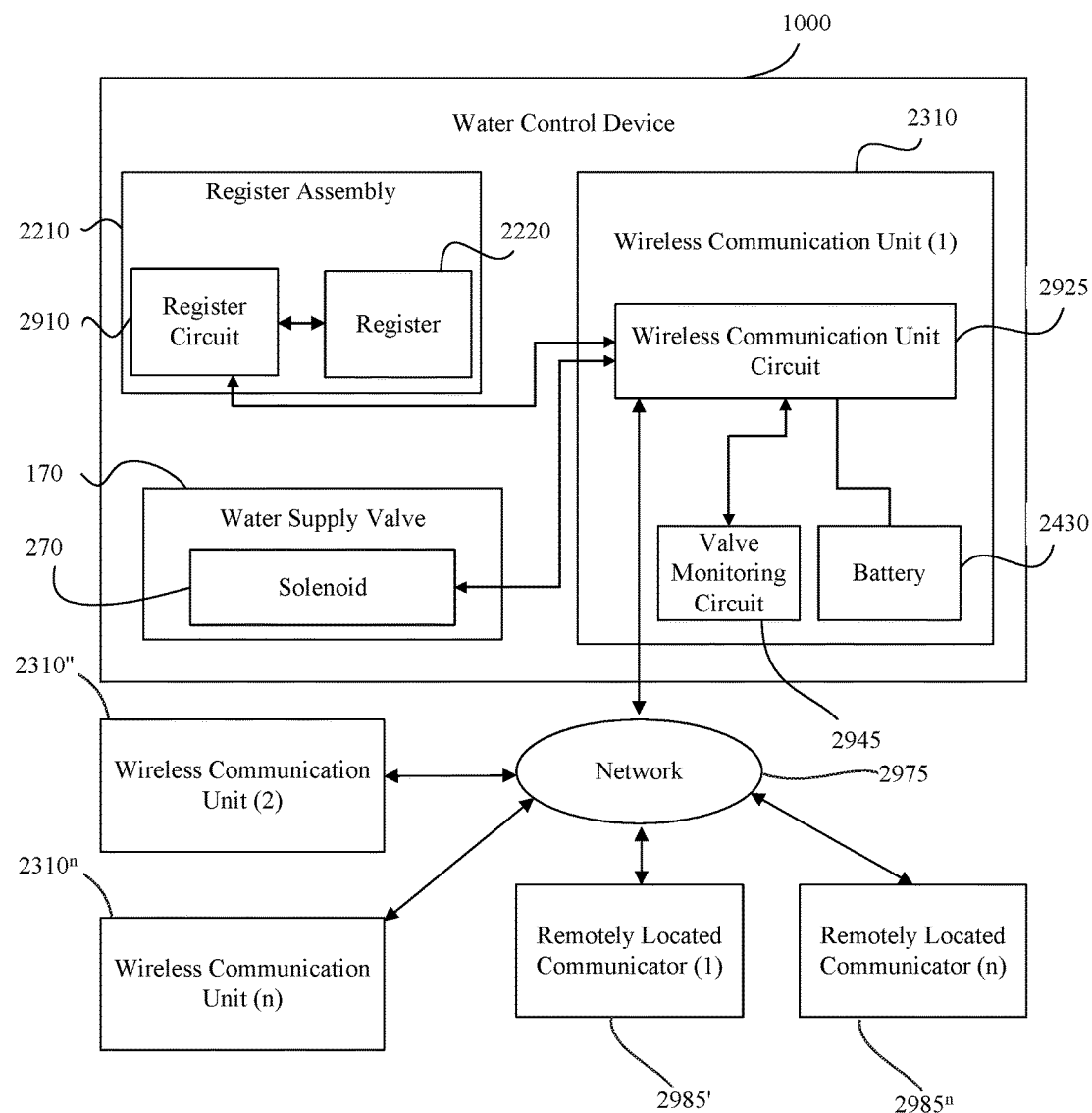
FIG. 29 is a circuit diagram of the valve meter assembly of FIG. 23.

In one embodiment, the register assembly 2210 may include a PCB (not shown). With reference to the circuit diagram of FIG. 29 and the block diagrams of FIGS. 30 and 31, the valve meter assembly 1000 includes the register assembly 2210 and the wireless communication unit 2310 in addition to the water supply valve 170, which itself includes the solenoid 270. The register assembly PCB may include a register circuit 2910 that reads the register 2220 electronically. The wireless communication unit 2310 includes the wireless communication unit circuit 2925 and is electrically connected to the register circuit 2910. The wireless communication unit 2310 is also electrically connected to the solenoid 270. As shown in FIG. 23, wires 2360 provide the electrical connections. The wires 2360 may be enclosed with tamper-proof jacketing. The battery 2430 of the wireless communication unit 2310 may be included in the electrical circuitry. In one embodiment, the battery is a lithium thionyl battery. The wireless communication unit circuit 2925 performs functions which may include interaction with the register circuit 2910, interaction with the water supply valve 170, or communication with one or more remotely located communicators (shown as 2985) via a network 2975. In some embodiments, the wireless communication unit circuit 2925 may replace the register circuit 2910 through electrical connection of the register 2220 with the wireless communication unit 2310. FIG. 29 also displays how the wireless communication unit 2310 is but one unit (wireless communication unit (1)) in a mesh network of wireless communication units (2-n) (shown as 2310" and 2310n), which may communicate with one or more remotely located communicators (1-n) (shown as 2985' and 2985").

Figure 25:
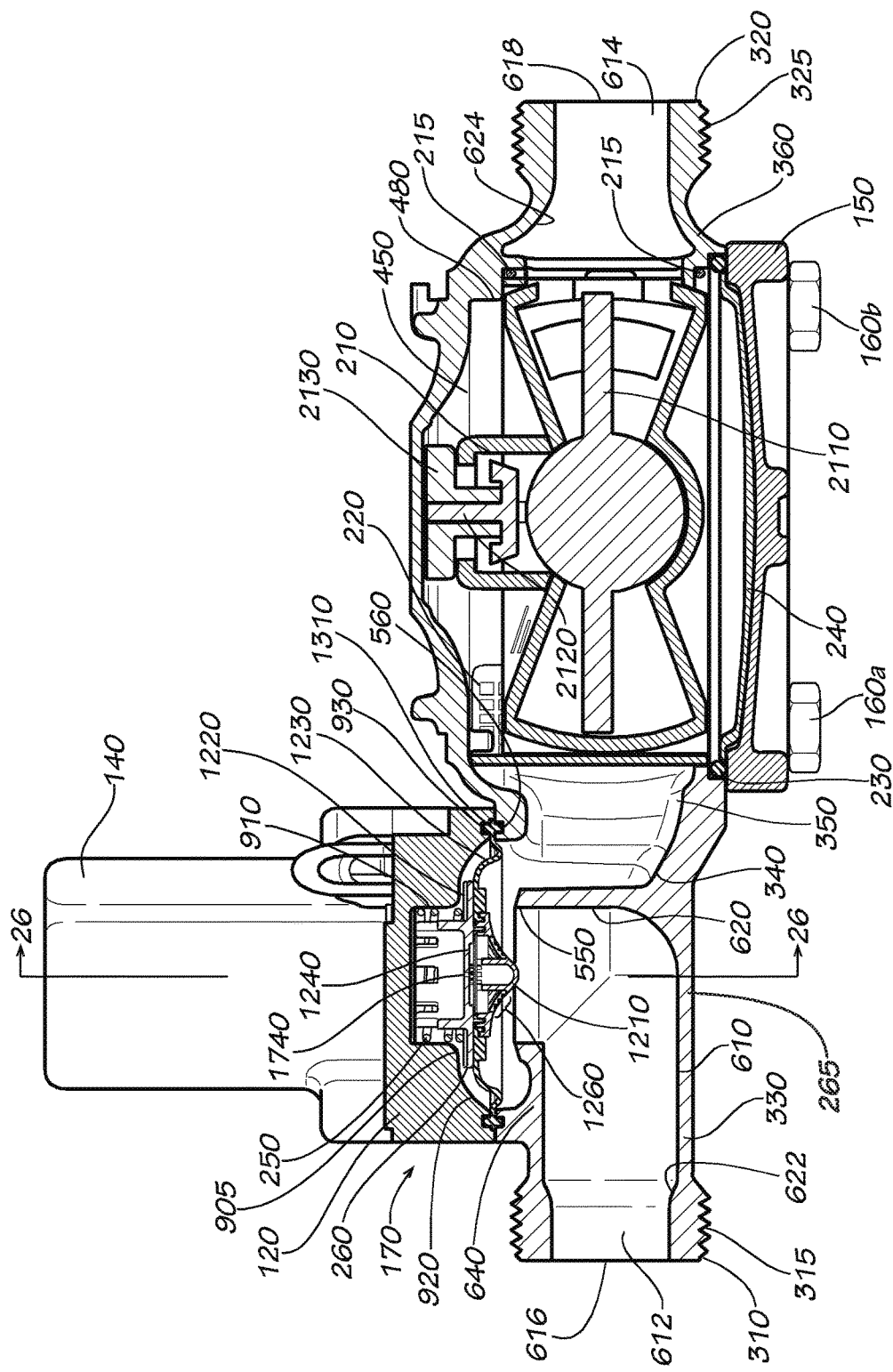
FIG. 25 is a sectional view of the valve meter device of FIG. 1 taken in a plane proceeding through the center axis of the flow path of water through the valve meter device.

FIG. 25 is a cross-sectional view of the assembled valve meter device 100 with the water supply valve 170 in an "open" state. The valve cover 120, along with the valve portion 265 of the device housing 110, encloses the diaphragm assembly 260 and spring 250. The gasketing diaphragm ring 1310 is enclosed within the diaphragm ring recess 560 and the diaphragm ring recess 930. The strainer retainer 220 is a porous fence that allows water to flow through the meter 210 while retaining particles behind strainer retainer 220. The strainer retainer 220 is positioned between the meter 210 and the meter inlet portion 350 inside the meter cavity 450. The bottom plate 150 is attached to the bottom of the device housing 110 with plate screws 160a, b,c,d and has the plastic liner 240 and the meter gasket 230 between the device housing 110 and the bottom plate 150. In this embodiment, the water supply valve 170 and the meter 210 are substantially in line between the inlet 310 and the outlet 320, as previously defined. The meter gasket 215 seals the interface between the metering outlet 213 and the meter outlet standoff 480.

Figure 26:
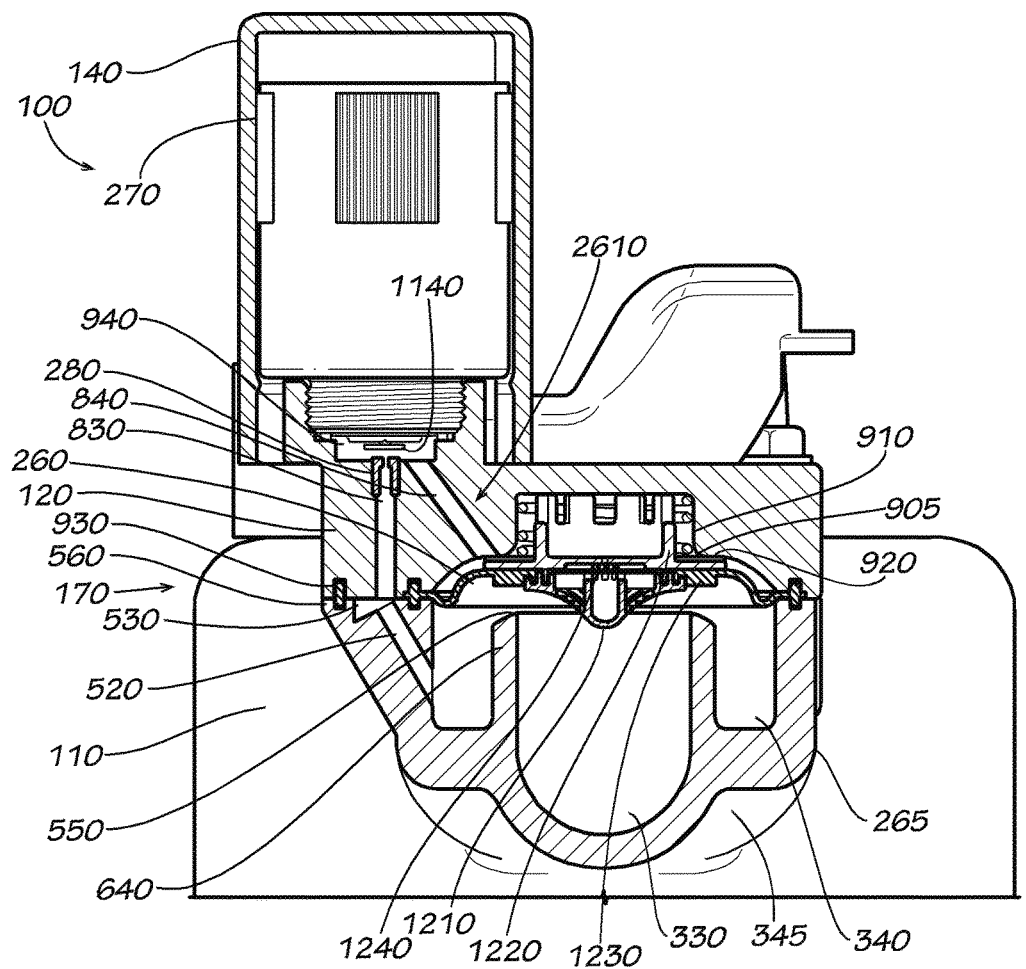
FIG. 26 is a sectional view of the valve meter device of FIG. 1 taken in a plane indicated by line 26 in FIG. 25 wherein the valve meter device is in the "open" state with the water supply valve and solenoid "open."

As illustrated in FIG. 26, the media channel pathway 2610 extends from the valve cavity 905 to the valve outlet portion 340. The media channel pathway 2610 includes the media channel 520, media channel relief 530, valve cover media channel 830, solenoid chamber 940, and the valve cavity media channel 840. The valve orifice cylinder 280 is placed inside the valve cover media channel 830. The action of the solenoid 270 either prevents or allows water flow through the media channel pathway 2610. The valve orifice cylinder 280 provides the interface with the interface portion 1140 of the plunger 1130. The valve orifice cylinder 280 is chosen of an appropriate size to prevent excessive fluid flow, as excessive fluid flow will cause the diaphragm assembly 260 to lift away from the beveled edge 550 quickly.

In the current embodiment, the water supply valve 170 is a pilot operated valve. A pilot operated valve is a valve that experiences large-scale operation occurring naturally as a result of a small change in the pilot. As such, small amounts of energy can be used to control large-scale changes as the pilot changes. In the current embodiment, the pilot-operated valve is a diaphragm valve.

In use, the valve meter device 100 may assume one of two states: an "on" or "open" state and an "off" or "closed" state. A "trickle" or "reduced flow" state may be substituted for the "off" or "closed" state in various embodiments. The valve meter device 100 may be configured to assume either of the two possible states. The states correspond to the positioning of the water supply valve 170.

The valve meter device 100 will typically be in the open state allowing a maximum, or near maximum, flow rate of water that is allowed to flow through the valve meter device 100. In the current embodiment, maximum flow rate is about 25 gallons per minute, although other maximum flow rates are possible in accord with this disclosure. When the valve meter device 100 is in the open state, the water supply valve 170 is open. When the water supply valve 170 is open, which occurs when the diaphragm 1230 is substantially lifted away from the beveled edge 550 (as seen in FIG. 25), the solenoid 270 is in the open position and the interface portion 1140 of the plunger 1130 is actuated away from the valve orifice cylinder 280, as seen in FIG. 26.

With reference to FIG. 25, water travels through the valve meter device 100 originating from a water source and entering in inlet 310. Water is permitted to travel through the inlet opening 612, into the inlet neck 622, and to the horizontal portion 610. When water reaches the intersection of the horizontal portion 610 and vertical portion 620, water is directed vertically into the vertical portion 620 by water pressure. Water exits the vertical portion 620 by flowing over the beveled edge 550. Water fills the valve transition portion 670 and—as will be described in more detail later—the valve cavity 905 and media channel pathway 2610. Water exits the valve portion 265 via the valve outlet portion 340 and enters the meter inlet portion 350. Water then enters and fills the meter cavity 450. Pressure forces water into the metering inlet 212, through the meter 210, and out of the metering outlet 213 to the meter outlet portion 360 and outlet 320. Once the water exits the outlet 320, the water flows through the downstream piping system and, ultimately, to the user terminal.

The water passing through the meter 210 moves the nutating disc 2110 causing the meter magnet 2130 to rotate. The rotation of the meter magnet 2130 causes the register 2220 to log the motion, leading to a measurement of water usage and a readout of water usage from the register 2220.

The register circuit 2910 configured to log the readout of water usage at preset timing intervals may be included with one embodiment of the valve meter device 100. In the current embodiment, the register circuit 2910 remains in a low power mode for the majority of its operating life. Low power, as used in this disclosure, means that the register circuit 2910 is using a very small amount of power when compared to the normal operating mode. This is commonly referred to as being in a "sleep mode." The register circuit 2910 "wakes up" at preset timing intervals to read the register 2220 and log the readout. In the current embodiment, the wireless communication unit circuit 2925 is connected with the register circuit 2910 via wires 2360. The wireless communication unit circuit 2925 obtains the log of the register circuit 2910 and transmits the log to a remotely located communicator at preset timing intervals. The preset timing interval of the wireless communication unit 2310 may or may not be the same preset timing interval as that of the register circuit 2910. In alternative embodiments, a separate register circuit 2910 may not be necessary if the wireless communication unit 2310 is capable of directly determining the measurement of water usage of the register 2220.

The water supply valve 170 is configured in the open state when the interface portion 1140 is lifted away from the valve orifice cylinder 280 because the solenoid 270 is in the open position, as seen in FIG. 26. The valve cavity media channel 840 provides a water pressure link between the solenoid chamber 940 and the valve cavity 905 such that the water pressure in the valve cavity 905 will be the same as the water pressure in the solenoid chamber 940. When the solenoid 270 is in the open position, the plunger 1130 is lifted so that the valve orifice cylinder 280 is open to the valve cover media channel 830. When the valve orifice cylinder 280 is uncovered, water is allowed to flow from the solenoid chamber 940 through the valve cover media channel 830 into the media channel 520 and further into the valve outlet portion 340. Therefore, the water pressure in the valve cavity 905 is substantially the same as the water pressure in the media channel 520, the solenoid chamber 940, the media channel 520, and the valve outlet portion 340. Thus, the diaphragm 1230 has no pressure behind it to close the water supply valve 170. The water supply valve 170 remains open. Although the current embodiment has the valve orifice cylinder 280 located on the valve cover media channel 830 such that there is a pressure link between the valve cavity 905 and the solenoid chamber 940, the valve orifice cylinder 280 may be located within the valve cavity media channel 840 in alternative embodiments. Other locations for the valve orifice are also contemplated by the current disclosure.

Figure 27:
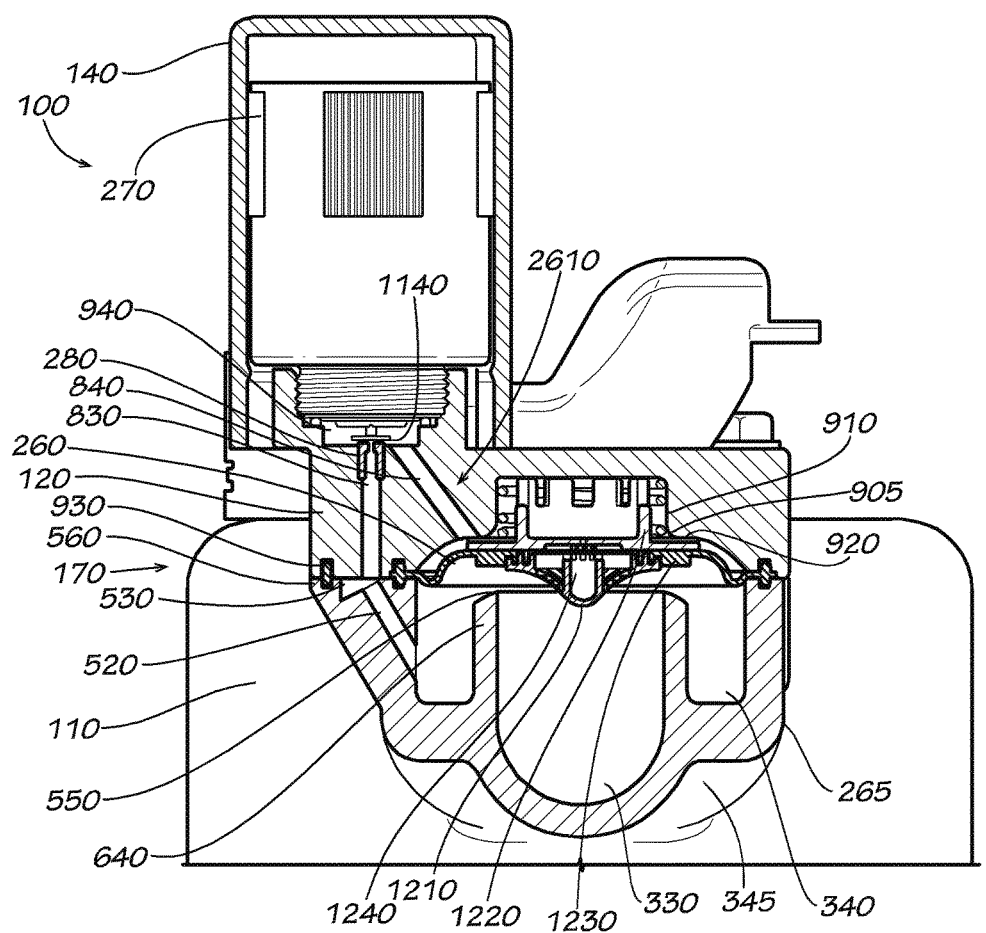
FIG. 27 is the sectional view FIG. 26 wherein the valve meter device is in a dynamic state with the solenoid in the "closed" position and the water supply valve in the "open" state.

Changing the valve meter device 100 to a closed state requires the water supply valve 170 to be changed to closed. Where a trickle state is included, the water supply valve must be changed to a trickle state, which may be the same as the closed state in various embodiments. This is accomplished by operation of the plunger 1130 moving into a closed position having the interface portion 1140 contacting the valve orifice cylinder 280, which provides a water-tight seal over the valve cover media channel 830. In the closed state, the valve meter device 100 allows no water flow through. In the trickle state, the valve meter device 100 allows minimal water flow through. In the current embodiment, minimal water flow is greater than zero gallons per minute and less than about 2 gallons per minute, although other minimal flow rates are possible in accord with this disclosure. FIG. 27 displays the water supply valve 170 in the dynamic state between the open and closed states. In this dynamic state, the solenoid 270 is in the closed position but the diaphragm assembly 260 is has not traveled to the beveled edge 550. In the current embodiment, the water supply valve 170 is a diaphragm valve with a pressure-controlled pilot operation. To move the valve meter device 100 into the closed state, the solenoid 270 is engaged, or "thrown," and closed onto the valve orifice cylinder 280.

Figure 28:
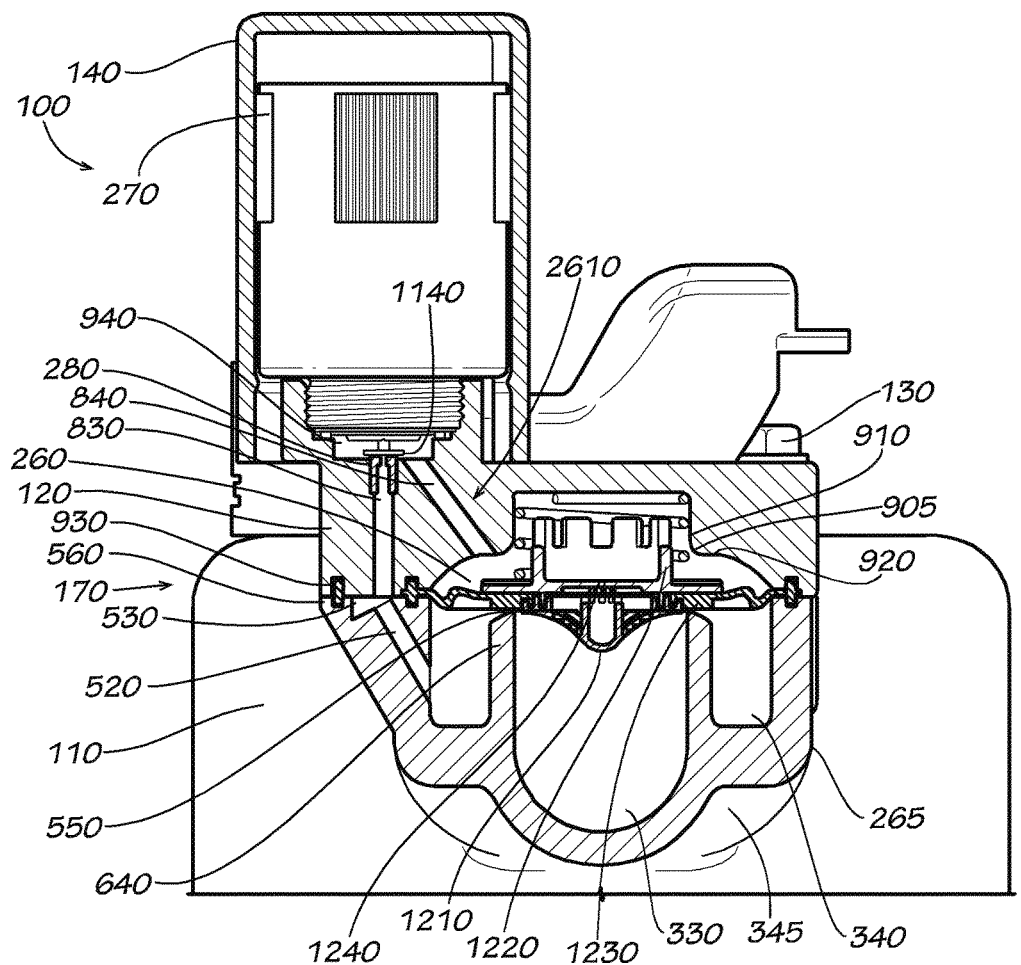
FIG. 28 is the sectional view FIG. 26 wherein the valve meter device is in the "closed" state with the water supply valve and solenoid "closed."

This closes or "severs" the media channel pathway 2610. Water flow is blocked from the solenoid chamber 940 to the valve cover media channel 830 as well as to the media channel 520 and media channel relief 530 thereby isolating the solenoid chamber 940, the valve cavity media channel 840, and the valve cavity 905 as one water pressure pool. Thus, the closing of the solenoid 270 is the pilot operation that triggers the dynamic state of the water supply valve 170. FIG. 28 displays the water supply valve 170 in the closed state, wherein the interface portion 1140 of the plunger 1130 is in contact with the valve orifice cylinder 280 and the diaphragm assembly 260 has traveled and contacted the beveled edge 550, sealing the water supply valve 170.

After the solenoid 270 is closed or thrown, water may no longer exit the valve cavity 905, so the valve cavity 905 no longer has media pressure behind it. Spring force provided from the diaphragm 1230 or from the optional spring 250 forces the diaphragm assembly 260 down toward the valve inlet portion 330 of the device housing 110. The spring 250 is optional because, depending on the configuration of the diaphragm 1230, the diaphragm 1230 may already be biased toward closing the water supply valve 170 without the spring 250. As the diaphragm assembly 260 moves toward the valve inlet portion 330, some of the water flowing through the valve portion 265 will leak through the water leak passthroughs 1260, through the strainer 1240, through the water leak hole 1740, and into the valve cavity 905. The increased volume of water in the valve cavity 905 creates increased pressure in the valve cavity 905. The increased pressure in the valve cavity 905 is applied to the entire surface of the diaphragm 1230 because the valve cavity 905 extends across the entire diaphragm 1230. This increased pressure applied over the entire diaphragm 1230 further biases the diaphragm assembly 260 in the direction of the valve inlet portion 330.

The increased bias causes the diaphragm assembly 260 to travel toward the valve inlet portion 330, eventually seating the bottom of the inner flat portion 1440 of the diaphragm 1230 onto the beveled edge 550 of the top edge portion 640 of the valve inlet portion 330. When the diaphragm 1230 seats onto the beveled edge 550, the water supply valve 170 is in the closed state.

Once the diaphragm 1230 has seated, water pressure from the valve inlet portion 330 equalizes with water pressure in the valve cavity 905 because water can pass into the valve cavity 905 through the valve cone 1210 of the diaphragm assembly 260 but cannot exit the valve cavity 905 down the media channel pathway 2610. With equalized pressure, the water supply valve 170 remains in the closed state because the cross-section of the valve inlet portion 330 provides a smaller surface area over which to apply pressure to the diaphragm 1230 than the surface area of the diaphragm 1230 that interfaces with the valve cavity 905. With the same pressure, a smaller surface area over which the pressure is applied produces a smaller force than the same pressure applied to a larger surface area. The result is a net downward force on the diaphragm 1230, maintaining the water supply valve 170 in the closed state. The trickle state is accomplished by placing the diaphragm 1230 in the same position as the diaphragm 1230 is placed in the closed state. However, in the trickle state, a small amount of water is allowed to bypass the water supply valve 170 via a leak passageway (not shown) in the diaphragm 1230 or a bypass channel (not shown) from the valve inlet portion 330 to the valve outlet portion 340. The bypass channel or leak passageway may be a small bore leading from the valve inlet portion 330 to the valve outlet portion 340 and may be placed in the vertical portion 620, for example. The bore would be small enough that a significant amount of water would not flow through the bore. A sealing valve may allow selective flow through the bore.

To reopen the water supply valve 170, the solenoid 270 is actuated so that the interface portion 1140 lifts away from the valve orifice cylinder 280, opening the media channel pathway 2610. Opening the media channel pathway 2610 establishes a pressure link between all of the components of the media channel pathway 2610, including the valve cavity 905, the valve cavity media channel 840, the solenoid chamber 940, the valve cover media channel 830, the media channel relief 530, and the media channel 520. When the pressure in the valve cavity 905 is reduced, the downward force on the diaphragm 1230 and the diaphragm assembly 260 is also reduced. The pressure in the valve inlet portion 330 provides greater upward force on the bottom of the diaphragm 1230 than the downward force on the top of the diaphragm 1230, which may be provided by the spring 250 or by the inherent bias of the diaphragm 1230. The result is a lifting of the diaphragm assembly 260, thereby opening the water supply valve 170.

The solenoid 270 may be engaged or lifted by manual operation, by electronic actuation, or by remote control. In one embodiment, the wireless communication unit 2310 is capable of receiving electrical signals for the solenoid 270 to control its operation. Actuation of the plunger 1130 in the current embodiment is performed by a solenoid 270, which is a latching solenoid in the current embodiment. A latching solenoid is a solenoid 270 that latches in place. A latching solenoid does not utilize energy once it has achieved its desired position but does use energy to change positions. However, this actuation can be performed via a number of mechanical or electromechanical interfaces, including stepper motors, DC motors, non-latching solenoids, electromagnets and other electromagnetic devices, and spring assemblies, among others. This embodiment would allow a remotely located communicator to control operation of the water supply valve 170, allowing the water supply valve 170 to be changed to an open or closed state from a remote location.

The wireless communication unit 2310 may include a wireless communication unit circuit 2925. The wireless communication unit circuit 2925 may be configured to log the status of the solenoid 270. For example, the communication unit circuit 2925 may log whether the solenoid 270 is in the open or closed position. Because operation of the solenoid 270 controls the water supply valve 170, the status of the solenoid 270 will be substantially the same as the status of the water supply valve 170 unless the water supply valve 170 is non-functioning or the water supply valve 170 is in a dynamic state between open and closed.

In a further embodiment, a valve monitoring circuit 2945 may be implemented. The valve monitoring circuit 2945 monitors the status of the water supply valve 170 by monitoring whether the solenoid 270 should be in the open position or in the closed position. If the solenoid 270 is logged to be in the closed position and the readings from the register circuit 2910 continue to change, the wireless communication unit 2310 may send a distress signal to alert the remotely located communicator that the water supply valve 170 of the valve meter device 100 is not operational. Alternatively, wireless communication unit 2310 may keep track of the expected state of the water supply valve 170 and determine if water flow is detected by the register assembly 2210.

The wireless communication unit 2310 and register circuit 2910 may be powered by a battery 2430. Each may have its own battery or each may be powered by the same battery. In the current embodiment, the solenoid 270, the wireless communication unit 2310, and the register circuit 2910 are all powered by the battery 2430. In the current embodiment, the battery 2430 is a lithium thionyl battery. In the current embodiment, the battery 2430 is capable of providing a nominal voltage of 3.6 VDC and a minimum voltage of 2.9 VDC with minimum available current of 300 mA. Other embodiments may include other electrical specifications.

In some embodiments, indicator lights (not shown) may be included. A valve indicator may be included to indicate the nominal state of the water supply valve 170. A mechanical remote valve indicator may also be included to ensure that actuation of the water supply valve 170 has commenced. Other remote and local indication mechanisms may also be used as well.

Figure 30:
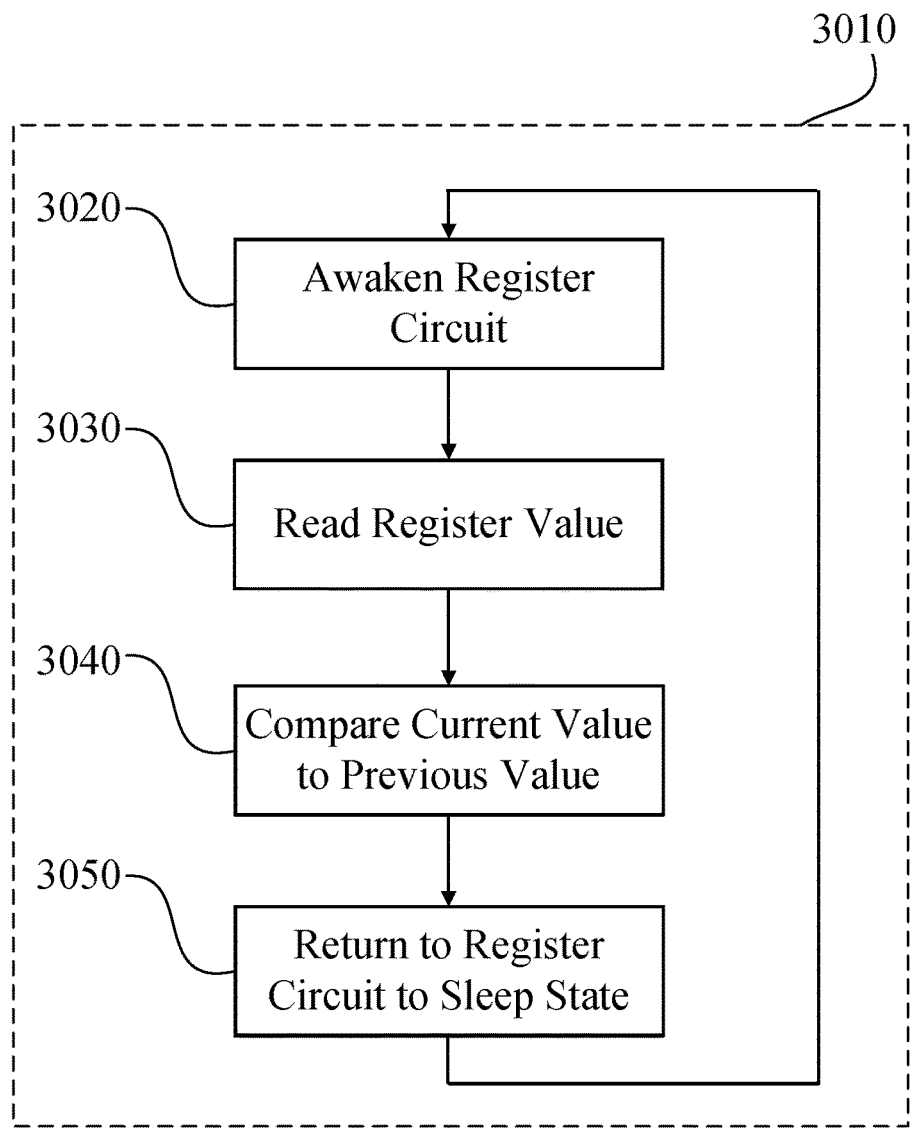
FIG. 30 is a flow diagram illustrating functioning of a register circuit of the valve meter assembly of FIG. 23.
Figure 31:
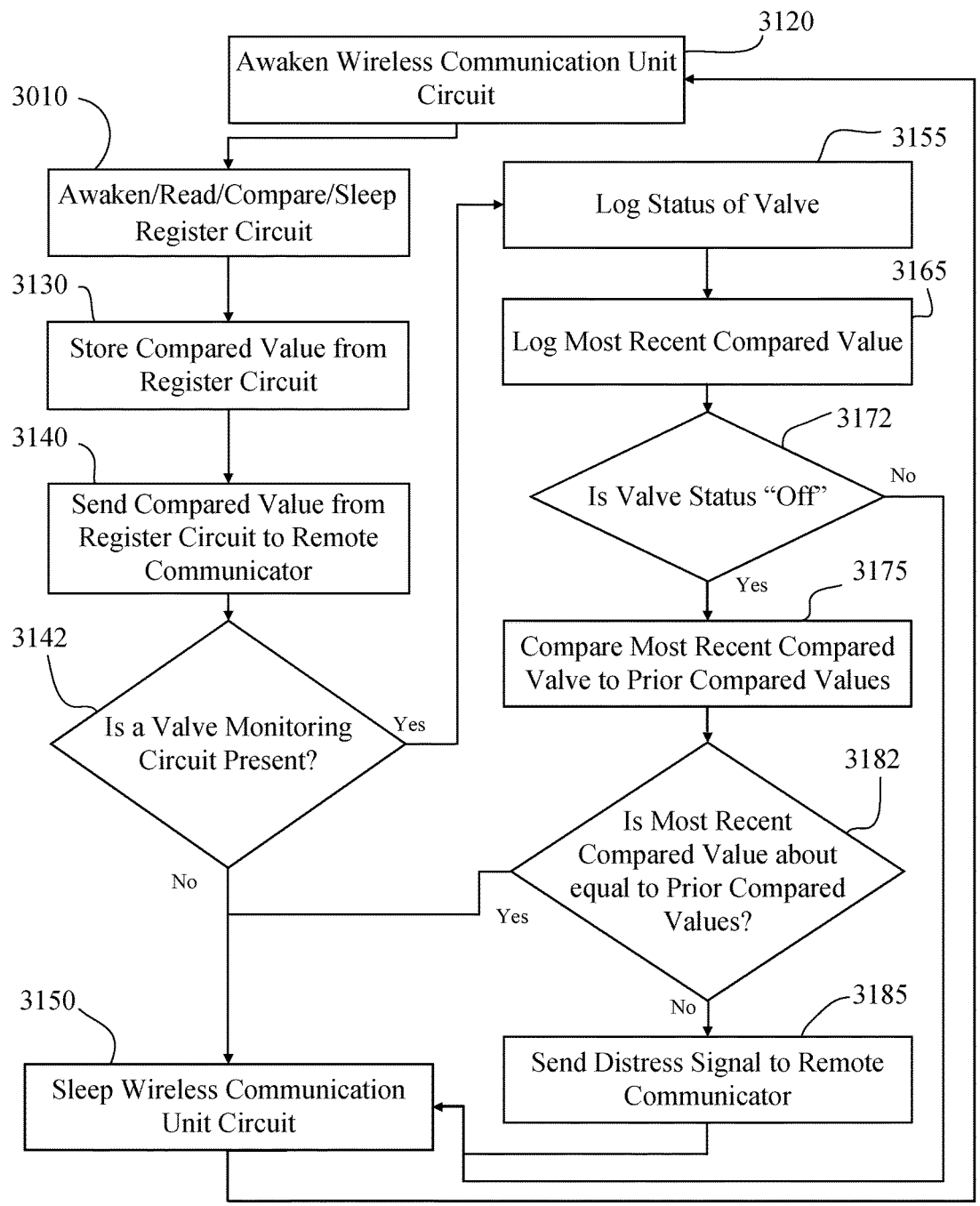
FIG. 31 is a flow diagram illustrating functioning of a wireless communication unit circuit, including a valve monitoring circuit, of the valve meter assembly of FIG. 23.

FIGS. 30 and 31 display diagrams of control logic for the circuits of the valve meter device 100. The operation of the register circuit 2910 is described by FIG. 30. In operation, the register circuit 2910 awakens on timed intervals as shown in step 3020. The value of the register 2220 is read in step 3030 and compared to previous register values in step 3040. The register circuit 2910 is returned to a sleep state in step 3050. The register circuit 2910 sleeps for a preset timing interval before repeating.

FIG. 31 displays a diagram of the control logic of wireless communication unit circuit 2925, including interaction with the optional valve monitoring circuit 2945. The wireless communication unit awakens at present timing intervals as shown in step 3120. In the current embodiment, the register circuit 2910 awakens, reads the register value, and compares the current value with the previous value as shown by step 3010. Following the step 3010, the wireless communication unit circuit 2925 stores the compared value from the register circuit 2910, as shown in step 3130, and sends that compared value to a remotely located communicator as shown with step 3140. Although the compared value from the register circuit 2910 is stored in memory in the current embodiment, the storing step need not be implemented in all embodiments, and in alternative embodiments, the storing step may be included with the remotely located communicator instead of with the wireless communication unit circuit 2925.

Included in this embodiment is the valve monitoring circuit 2945. However, the valve monitoring circuit 2945 may not be present in all embodiments, as depicted by step 3142 in FIG. 31. If a valve monitoring circuit 2945 is present, the status of the water supply valve 170 is logged by determining whether the solenoid 270 is in the open or closed position, represented by step 3155. The valve monitoring circuit 2945 also logs the most recent compared value from the register circuit 2910 as shown in step 3165. If the status of the water supply valve 170 is open or on, the circuit bypasses further logic, as represented by step 3172, and proceeds to allow the wireless communication unit circuit 2925 to sleep as in step 3150. If the status of the water supply valve 170 is closed or off, the valve monitoring circuit 2945 includes further steps. As represented by step 3175, the most recent compared value of the register circuit 2910 is compared to prior values of the register circuit 2910 that are logged in memory of the valve monitoring circuit 2945. If the most recent compared value of the register circuit 2910 is substantially different from prior compared values of the register circuit 2910, shown by step 3182, the valve monitoring circuit 2945 is configured to send a distress signal from the wireless communication unit 2310 to the remotely located communicator, represented by step 3185. The valve monitoring circuit 2945 then continues to sleep the wireless communication unit circuit 2925, as shown by step 3150, which sleeps for a preset timing interval before repeating.

One should note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Unless stated otherwise, it should not be assumed that multiple features, embodiments, solutions, or elements address the same or related problems or needs. Thus, such conditional language is not generally intended to imply that features, elements, and/or steps are in any way required for one or more particular embodiments or that one or more particular embodiments necessarily include logic for deciding, with or without user input or prompting, whether these features, elements, and/or steps are included or are to be performed in any particular embodiment.

It should be emphasized that the above-described embodiments are merely possible examples of implementations, merely set forth for a clear understanding of the principles of the present disclosure. Any physical properties described above should be understood as representing one of many possible embodiments, and alternate implementations are included depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. An assembly comprising:
a housing, the housing comprising a valve portion defining at least one inlet opening and a meter portion defining at least one outlet opening, the valve portion positioned adjacent to the meter portion in a direction of a lay-length of the assembly, the housing defining a channel connecting the at least one inlet opening and the at least one outlet opening, the at least one inlet opening comprising an inlet end and the at least one outlet opening comprising an outlet end, there being a linear distance between the inlet end and the outlet end, the linear distance being no greater than a water meter lay-length;
a water meter positioned in the meter portion and in the channel, the water meter configured to monitor a flow of water through the assembly; and
a valve positioned in the valve portion and in communication with the channel and configured to control the flow of water through the assembly, the water meter and the valve in line with the inlet opening and the outlet opening, the valve defining a valve inlet portion, a valve outlet portion, and a media channel, the valve inlet portion defining a vertical portion,
wherein the vertical portion separates the valve inlet portion from the valve outlet portion, wherein the valve inlet portion is in fluid communication with the valve outlet portion over a top edge portion defined by the vertical portion, wherein the valve inlet portion is sealable from the valve outlet portion by a diaphragm assembly of the valve, wherein the diaphragm assembly defines a water leak passthrough, wherein the water leak passthrough is configured to allow passage of water from the valve inlet portion to a top side of the diaphragm assembly opposite the valve inlet portion when the diaphragm assembly has sealed the valve inlet portion from the valve outlet portion, wherein the media channel extends from the valve outlet portion to the top side of the diaphragm at one lateral side of the valve portion relative to the inlet, and the media channel defines a housing portion that is angled with respect to a vertical direction defined by the vertical portion, the housing portion defined in the housing.

2. The assembly of claim 1, wherein the valve portion and the meter portion of the housing are integrally formed.

3. The assembly of claim 1, wherein the valve comprises a valve cover attached to the valve portion of the housing and configured to receive a solenoid.

4. The assembly of claim 3, wherein:
the valve cover defines a valve cavity;
the media channel comprises an angled valve cavity media channel extending from the valve cavity to a solenoid attachment portion;
the media channel further defines a vertical valve cover portion of the media channel, the valve cover portion extending from the solenoid attachment portion and defined in the valve cover;
the valve cover defines a valve orifice cylinder above the valve cover portion of the media channel;
the valve further comprises a solenoid configured to selectively cover the valve orifice cylinder.

5. The assembly of claim 4, wherein the solenoid attachment portion comprises a cylindrical boss defining a threaded solenoid attachment sink on an inside of the boss.

6. The assembly of claim 1, wherein the valve inlet portion comprises a horizontal portion and wherein the valve inlet portion vertical portion defines a beveled edge parallel to and configured to receive the diaphragm assembly.

7. The assembly of claim 1, wherein the vertical portion and the horizontal portion form a right angle with each other.

8. The assembly of claim 1, wherein the valve is positioned proximate to the inlet opening of the housing.

9. The assembly of claim 1, wherein an axis of the valve inlet portion is located in the same approximate horizontal plane as an axis of the inlet end and an axis of the outlet end of the housing.

10. The assembly of claim 1, wherein the valve outlet portion comprises a slanted bottom portion, the slanted bottom portion slanting downward from the direction of the inlet opening towards the outlet opening and configured to reduce head loss by promoting consistent flow.

11. The assembly of claim 1, wherein the diaphragm assembly comprises:
a curvilinear valve cone extending into the valve inlet portion;
a flexible diaphragm placed onto the valve cone;
a disc-shaped strainer centered on the valve cone; and
a backing plate placed over the strainer and diaphragm, the backing plate comprising a cylindrical weld portion at which the backing plate is welded to the valve cone.

12. The assembly of claim 11, wherein the valve cone defines a plurality of water subchannels extending radially outward from a center of the valve cone to a circular weld channel,
wherein the water subchannels are configured to be in fluid communication with the water leak passthrough, and
wherein the circular weld channel is configured to receive the cylindrical weld portion of the backing plate.

13. An assembly for use with a water meter, the assembly comprising:
a housing comprising a meter portion integrally formed with a valve portion, at least one inlet defined in the valve portion, and at least one outlet formed in the meter portion, the inlet comprising an inlet end and the outlet comprising an outlet end, the housing comprising an outer surface and an inner surface, the inner surface shaped to receive the water meter and defining an internal cavity comprising an inlet and an outlet; and
a valve positioned in the valve portion and in sealable communication with the inner surface, the valve defining a valve inlet portion, a valve outlet portion, and a media channel, the valve inlet portion defining a vertical portion,
wherein the vertical portion separates the valve inlet portion from the valve outlet portion,
wherein the valve inlet portion is in fluid communication with the valve outlet portion over a top edge portion defined by the vertical portion,
wherein the valve inlet portion is sealable from the valve outlet portion by a diaphragm assembly of the valve, wherein the diaphragm assembly defines a water leak passthrough,
wherein the water leak passthrough is configured to allow passage of water from the valve inlet portion to a top side of the diaphragm assembly opposite the valve inlet portion when the diaphragm assembly has sealed the valve inlet portion from the valve outlet portion,
wherein the media channel extends from the valve outlet portion to the top side of the diaphragm, and the media channel defines a portion that is angled with respect to a vertical direction defined by the vertical portion.

14. The assembly of claim 13, wherein the internal cavity inlet portion defines a substantially rectangular opening.

15. The assembly of claim 13, wherein the valve and the water meter are placed substantially in line between the at least one inlet and the at least one outlet.

16. The assembly of claim 15, wherein the media channel is defined at one lateral side of the valve portion relative to the inlet.

17. The assembly of claim 13, wherein a diameter of the valve outlet portion of the valve is greater than a diameter of the valve inlet portion.

18. The assembly of claim 13, wherein an axis of the valve inlet portion is located in the same approximate horizontal plane as an axis of the inlet end and an axis of the outlet end of the housing.

19. The assembly of claim 13, wherein the valve defines a valve orifice cylinder, the valve comprising a solenoid configured to selectively cover the valve orifice cylinder.

20. The assembly of claim 13, wherein the diaphragm assembly defines a valve cone extending towards the valve inlet portion.

21. The assembly of claim 13, wherein the diaphragm assembly defines a plurality of water leak passthroughs configured to allow passage of water from a first side of the diaphragm assembly to a second side of the diaphragm assembly opposite from the first side.

22. The assembly of claim 13, wherein the valve further defines a media channel extending from the valve outlet portion to the second side of the diaphragm, and wherein the water leak passthrough allows passage of water when the diaphragm assembly seals the valve inlet portion from the valve outlet portion.

23. A method of using a valve meter assembly, the method comprising:
receiving a flow of water into a valve inlet portion of the valve meter assembly, the valve meter assembly comprising a housing defining a valve portion defining the valve inlet portion and a meter portion defining an inner cavity, a water meter positioned inside the inner cavity of the meter portion;
directing the flow of water through the valve meter assembly so that the flow of water moves from a horizontal portion of the valve inlet portion to a vertical portion of the valve inlet portion;
directing the flow of water past a top edge of the vertical portion of the valve inlet portion into a valve outlet portion;
directing the water into a valve outlet portion;
directing the water into the water meter via a meter inlet portion of the meter portion of the housing;
reducing the flow of water through the valve meter assembly by sealing a diaphragm assembly against the top edge of the valve inlet portion to seal off the valve inlet portion from the valve outlet portion, the diaphragm assembly defining a water leak passthrough configured to allow passage of water from the valve inlet portion to a top side of the diaphragm assembly opposite the valve inlet portion when the diaphragm assembly has sealed the valve inlet portion from the valve outlet portion;
directing water through a media channel, the media channel extending from the top side of the diaphragm assembly to the valve outlet portion, the media channel angled and offset from a vertical plane in line with the water meter and diaphragm assembly;
reducing a downward force on the diaphragm assembly; and
unsealing the diaphragm assembly.

24. The method of claim 23, further comprising:
stopping the flow of water through the valve meter assembly by sealing the diaphragm assembly against the top edge of the valve inlet portion to seal off the valve inlet portion from the valve outlet portion.

25. The method of claim 24, wherein the diaphragm assembly defines a plurality of water leak passthroughs.

26. The method of claim 24, wherein the valve meter assembly comprises a valve defining a valve orifice cylinder, the valve comprising a solenoid configured to selectively cover the valve orifice cylinder, wherein stopping the flow of water comprises contacting a valve orifice cylinder of the valve with a plunger of the solenoid.

27. The method of claim 24, wherein stopping the flow of water comprises equalizing the water pressure acting on opposite sides of the diaphragm assembly.

28. The method of claim 23, wherein:
sealing the diaphragm assembly against the top edge of the valve inlet portion comprises sealing the first side of the diaphragm assembly against the top edge of the valve inlet portion;
the valve outlet portion is in fluid communication with the second side of the diaphragm by a media channel; and
reducing the water flow further comprises blocking the water from flowing through the media channel from the second side of the diaphragm to the valve outlet portion.

* * * * *